US007813944B1

(12) United States Patent
Luk et al.

(10) Patent No.: US 7,813,944 B1
(45) Date of Patent: Oct. 12, 2010

(54) DETECTION OF INSURANCE PREMIUM FRAUD OR ABUSE USING A PREDICTIVE SOFTWARE SYSTEM

(75) Inventors: Ho Ming Luk, San Diego, CA (US);
Pamela E. Coates, San Diego, CA (US);
Arati S. Deo, San Diego, CA (US); Sean M. Downs, Laguna Hills, CA (US);
Benjamin A. Friesen, Long Beach, CA (US); Craig A. Nies, Carlsbad, CA (US);
Anu K. Pathria, La Jolla, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 0 days.

(21) Appl. No.: 09/373,926

(22) Filed: Aug. 12, 1999

(51) Int. Cl.
*G06Q 40/00* (2006.01)
*G06Q 10/00* (2006.01)
*G06F 19/00* (2006.01)

(52) U.S. Cl. .................... 705/4; 705/2; 705/3
(58) Field of Classification Search ............ 705/2–4
See application file for complete search history.

(56) References Cited

U.S. PATENT DOCUMENTS

| 4,831,526 | A | | 5/1989 | Luchs et al. ............. 705/4 |
| 5,224,173 | A | | 6/1993 | Kuhns et al. ............ 382/116 |
| 5,253,164 | A | | 10/1993 | Holloway et al. ........... 705/2 |
| 5,577,169 | A | * | 11/1996 | Prezioso ................. 706/52 |
| 5,655,085 | A | | 8/1997 | Ryan et al. .............. 705/4 |
| 5,819,226 | A | * | 10/1998 | Gopinathan et al. ......... 705/1 |
| 5,822,741 | A | * | 10/1998 | Fischtal ................ 706/16 |
| 5,835,897 | A | | 11/1998 | Dang ................... 705/2 |
| 5,907,602 | A | | 5/1999 | Peel et al. ............ 379/114.14 |
| 5,930,762 | A | | 7/1999 | Masch ................... 705/7 |
| 5,974,390 | A | | 10/1999 | Ross .................... 705/4 |
| 6,029,144 | A | | 2/2000 | Barrett et al. ............ 705/30 |
| 6,049,773 | A | | 4/2000 | McCormack et al. ........ 705/4 |
| 6,253,186 | B1 | * | 6/2001 | Pendleton, Jr. ............. 705/2 |

OTHER PUBLICATIONS

Anonymous, "HNC Insurance Solutions Introduces Spyder, software for Healthcare Fraud & Abuse containment", Business Wire, Dec. 14, 1998, p. 1.*

(Continued)

*Primary Examiner*—Robert W Morgan
(74) *Attorney, Agent, or Firm*—Mintz, Levin, Cohn, Ferris, Glovsky and Popeo, P.C.

(57) ABSTRACT

Detection of insurance premium fraud is provided by a predictive model, which uses derived variables to assess the likelihood of fraud for each policy. The predictive model produces a score, which is a measure of the likelihood of premium fraud or abuse. The predictive model is included in a system that accepts policies to be considered for scoring, selects which policies are appropriate for scoring, stores data about the policies in a database, uses the data to derive variables for the model, and processes and outputs the model scores and related information. A rule-based analysis, which detects specific inconsistencies in the data that are indicative of premium fraud, may also be part of the system. The model scores and red-flag indicators from the rule-based analysis may be further processed to provide customized output for users.

59 Claims, 9 Drawing Sheets

OTHER PUBLICATIONS

Anonymous, "HNC Insurance Solutions Delivers Predictive Software for Detecting Premium Fraud; Workers' Compensation Fund of Utah First Carrier to Deploy Vericomp Employer", Business Wire, Jun. 3, 1999, 3 pages.*

Anonymous, "EDS, HNC Software, and ITC Team up to Tackle Medicaid Fraud; Alliance will Provide Intelligent Detection software to State Agencies", Business Wire, Apr. 27, 1998, 2 pages.*

Brown et al., "Neural Networks enter the world of management accounting", Management Accounting, May 1995, vol. 76, No. 11, p. 51.*

Downs, Sean, "Technology, Education Aid Medical Fraud Fighting", Employee Benefit News, Dec. 1998, vol. 12, No. 3.*

Hann Werstein, Leslie, "High-Tech Sleuths", Best's Review, Nov. 1998.*

Downs, Sean, Technology, Education Aid Medical Fraud Fighting', Employee Benefit News, Dec. 1998, vol. 12, No. 3.*

Bank, D., "Know Your Customer", Wall Street Journal, Jun. 21, 1999.

Derrig, R.A., "Patterns: Fighting Fraud With Data", *Contingencies*, Sep./Oct. 1999, pp. 40-48.

Downs, S., "Technology, Education Aid Medical Fraud Fighting", *Employee Benefit News*, No. 13, vol. 12, Dec. 1998, New York, NY.

Downs, S., "Predictive Technology and the Transformation of the Insurance Industry", *Contingencies*, No. 10, vol. 6, Nov./Dec. 1998, pp. 64-67.

Mutch, J., "Unlocking the Neural Network", *Risk & Insurance*, Jan. 1999.

Pathria, A., "Fraud", *Risk Management*, Mar. 1999, pp. 23-28.

"An Analysis of Workers Compensation Outreach Materials", *Coalition Against Insurance Fraud*, Apr. 1999.

"Four Faces: Why some Americans do—and do not—tolerate insurace fraud", *Coalition Against Insurance Fraud*, Oct. 1997.

"Report on Workers' Compensation Fraud", *Report of the Fourteenth Statewide Grand Jury*, July Term, 1997, Case No. 90,703, accessed at legal.fim.edu.swp/jury/workers.htm.

"Employer/Premium Fraud", Author Unknown, accessed at www.insurance.ca.gov/FRO/Chapter8.html, dated Sep. 24, 1996.

"NCCI and DRB Announce the Risk Snapshot Report", press release, Oct. 15, 1997, accessed at www.dnb.com/newsview/1097news4.html.

"Indicators of Workers' Compensation Fraud," *National Insurance Crime Bureau*, Oct. 1994.

Bond, J., "Fighting Workers' Compensation Fraud", www.pimall.com/nais/n.ins.bond.html, accessed on Nov. 4, 1999.

"Combating The High Cost of Insurance Premium Fraud." *Ernst & Young*, Apr. 1998 www.ey.com accessed on Nov. 4, 1999.

Hann, L., "High-Tech Sleuths," *Best's Review*, Nov. 1998.

Reich-Hale, D., "Computer Gumshoes Help Snare Scam Artists", *National Underwriter*, Sep. 14, 1998.

Selected pages from InfoGlide Corporation website, www.infoglide.com, accessed on Nov. 22, 1999.

Starner, T., "Which Way to the Web?", *Risk & Insurance*, Jul. 1998.

Strain, S., "Management Tools for Fraud Prevention", *National Healthcare Anti-Fraud Association, 1998 Annual Training Conference*, Nov. 11-14, 1998, San Diego, California.

Selected pages from *Alta Analytics*, www.altanalytics.com/netmap.html, accessed on Nov. 4, 1999.

Tarpinian, G., "Common Forms of Employer Fraud", *Prairielaw Journal*, www.prairielaw.com/journal/articles/wcfraud2.shtm, accessed on Nov. 4, 1999.

Harshbarger, S., "Premium Fraud", Issues in Workers' Compensation, a Collection of White Papers: Attorney General's Task Force to Reduce Waste, Fraud and Abuse in the Workers' Compensation System, Jul. 1994.

Alden, D., "Neural Nets Nab Medicaid Fraud", *Government Technology*, Oct. 1997.

Bank, D., "HNC to Offer Its Antifraud Service for the Web", *Wall Street Journal*, May 10, 1999.

Benton, M., "Booking New Laws", *Claims Magazine*, Aug. 1997, pp. 42-45.

Brockett, P.L., et al., "Using Kohonen's Self-Organizing Feature Map to Uncover Automobile Bodily Injury Claims Fraud", *Journal of Risk and Insurance*, Jun. 1998, p. 245.

Chin, Tyler L., "Health Insurers Turn to Software for Fraud Busting", *Health Data Management*, Nov. 1997, pp. 88-92.

Derrig, R.A. & Ostaszewski, K.M., "Fuzzy Techniques of Pattern Recognition in Risk and Claim Classification; Symposium on Insurance Solvency & Finance", *Journal of Risk and Insurance*, No. 3, vol. 62, 1995, p. 447.

Hernandez, G. & Blanquie, R., "SIU Performance Audits Heat Up in California", *Claims Magazine*, Aug. 1997, pp. 57-59.

Johnston, D.C., "Audits Spread Unevenly Across U.S.", *New York Times*, Apr. 12, 1998, Section Y, p. 17.

Lifsher, M., "State Audits Workers' Comp Firms", *Wall Street Journal*, Sep. 24, 1997, pp. CA1.

Mahli, P., "Automated System Brings to Light Workers Comp Fraud Claims", *Journal of Commerce*, Aug. 28, 1998.

Pence, Linda L., "Combating Workers Compensation Premium Fraud", 1997.

Zizzamia, F.M. & Wu, P. C., "Driven by Data: Making Sense Out of Neural Networks", *Contingencies*, May/Jun. 1998, vol. 10, No. 3, pp. 40-44.

"On the Front Lines: Helping Claims Administrators Fight Workers' Comp Fraud", Sections IX—X, California Workers' Compensation Institute, May 1989.

"Commonly Asked Questions About Combating Health Insurance Fraud and Abuse", Integrity Plus Services, Inc., Jan. 1998.

"Fraud in the Texas Workers' Compensation System", *Texas Monitor*, vol. 2, No. 4, Winter 1997, the Research and Oversight Council on Workers' Compensation, www.roc.capnet.state.tx.us/2-4.htm.

PCT Search Report PCT/US00/21298.

Daniels, S., "High-Tech Tool for Fighting Health Fraud", *National Underwriter*, Oct. 6, 1997, pp. 27.

Galfond, G., "Data Mining Can Unearth a Competitive Edge", *National Underwriter*, Oct. 6, 1997, pp. 10.

Manchur, D., "Mining for Fraud", *Canadian Insurance*, Sep. 1998, pp. 24.

Schwartz, S., "Artificial Intelligence: Reviving the Love Affair", *Insurance & Technology*, Aug. 1996, pp. 42.

Tauhert, C., "Neural Networks: Not Just a Black Box", *Insurance & Technology*, Apr. 1997, pp. 30.

Brochure: Insurance Solutions, Vericomp Claimant. *Claimant Fraud and Abuse Detection for Workers' Compensation*, HNC Software.

* cited by examiner

DETECTION OF INSURANCE PREMIUM FRAUD OR ABUSE USING A PREDICTIVE SOFTWARE SYSTEM

BACKGROUND

1. Field of the Invention

This invention relates generally to the detection of insurance policyholders who make fraudulent statements, take fraudulent actions or in some way misrepresent themselves in order to reduce the premiums they pay. In particular, the invention relates to an automated fraud and abuse detection system using predictive modeling (statistical analyses) in order to identify policyholders having high suspicion of premium fraud.

2. Background of the Invention

Insurance fraud is currently receiving unprecedented attention. Recent statistics support the focus on this criminal activity. In Conning & Company's 1996 study, *Insurance Fraud: The Quiet Catastrophe*, U.S. insurance fraud losses are estimated to exceed $120 billion annually. In general, however, respondents to the Conning & Company survey underestimated the overall cost of fraud, so while the overall savings from fighting fraud has reached $5 billion per year, this still leaves at least $115 billion being lost every year to insurance fraud. The industry as a whole has much work to do in order to significantly reduce fraud losses. The typical return on investment for fraud fighting efforts in 1995 was 6.88:1, up from 5.84:1 in 1994. The Conning and Company study concludes that from a cost-benefit perspective, insurers still have significant room to maintain, and even improve, their return on investment from fighting fraud.

One type of insurance fraud is premium fraud, in which the policyholder misrepresents policy-related information in order to fraudulently reduce the amount of insurance premiums paid to the insurer. FIG. 1 illustrates how premium fraud arises in insurance relationships, and how insurers respond to it. In FIG. 1, a policyholder is an entity that obtains an insurance policy from an insurer. The policyholder may be a business or an individual. The policyholder wishes to minimize exposure to certain risks, such as the risk of loss of life, health, livelihood, property, or profitability or the like, for which there are corresponding forms of insurance (e.g., life, health, disability, home and automobile, and liability insurance). These risks may arise as risks to persons such as the employees, children, and others who are generally understood to be under the control or supervision of the policyholder or risks to property also under the control, ownership or supervision of the policyholder. The policyholder and/or those persons under the control or supervision of the policyholder generally engage in activities which may result in losses to the policyholder, persons under the control or supervision of the policyholder, or third parties. The policyholder purchases insurance from an insurer such that those losses that are suffered by the policyholder directly or that would (in the absence of insurance) result in claims made against the policyholder become, by proxy, claims against the insurer. The insurer insures the activities by compensating the claimants in accordance with the terms of the policy.

To determine the premium that is needed to underwrite the policy, the insurer must have a way to quantify the risks that it faces in insuring the policyholder. To quantify the risks, the insurer obtains various types of data from the policyholder, that variously measures the policyholder's and the claimants current and past behavior and/or attributes (including the value of objects owned) relevant to the policy that is being purchased. These measures are generally described herein as "activity measures." The activity or attributes being measured by an activity measure will vary depending on the type of insurance. In the context of workers' compensation insurance, the activity being measured is the amount of work in specific jobs, since that is where the risk of injury occurs. An attribute is the industry in which the insured company operates. In automobile insurance, for example, the activity and attributes include type of car, miles driven, and characteristics of the primary driver. In homeowner's insurance the activity and attributes include the value of the home, safety precautions used in the home, and the risk of natural disasters. The activity and attributes are reported by the policyholder to the insurer, who calculates the premium that the policyholder pays.

Because the insurer bases the premium on the perceived and quantified risks to the policyholder, the policyholder has an incentive to misrepresent himself as less risky than he actually is, and thereby to reduce the premium, i.e., to commit premium fraud. As shown in FIG. 1, it is generally the responsibility of the insurer to guard against premium fraud and abuse. Insurance companies conventionally attempt to limit premium fraud in two ways: (i) by carefully screening applicants for policies (underwriting); and (ii) by auditing and/or investigating policyholders. While selective underwriting can eliminate some applicants whose policy information appears suspicious, once an applicant becomes a policyholder there is an ongoing risk of premium fraud. Thus audits and investigations are important tools in an insurer's defense against premium fraud.

The object of an audit is to recover premium due, but not invoiced, because information used to determine premium was inaccurately declared by the policyholder. Audits also assist underwriting by setting a baseline of accuracy from which to build future underwriting decisions. A successful audit results in accurate premium adjustments for past policy periods and the recovery of premium owed.

Given the costs involved in an audit, not every policy can be audited. Rather, it is desirable to select and audit those policies most likely to involve inaccuracies that will result in substantial premium recoveries. Therefore, the effectiveness of using audits or investigations for recovering premium lost to fraud or abuse depends on the method used to determine which policyholders to audit or investigate.

Historically, insurers have developed various ad hoc procedures for selecting policies to audit. For example, an insurance company may choose to audit its large policies, on the grounds that they will catch the fraud and abuse that involve large premium amounts. Or an insurer may audit policyholders using geographical screening measures, such as auditing policyholders in selected zip codes. Another choice is to audit particular policyholder groups known to have higher incentives for premium misrepresentation, such as those that face particularly high rates for insurance. Such ad hoc methods for choosing policies to audit are reasonable if the auditors lack a way to assess individual policies for the likelihood of premium fraud. However, they result in auditing a great many policies that are honest (false positives) while many fraudulent policies are never caught (false negatives).

When misrepresentation is found through an audit, several possible actions may be taken. The auditor may correct the problem on a going forward basis; the insurer may bill the policyholder for back-premium due; the policy may be canceled; or the policyholder may be referred to the insurance company's Special Investigations Unit for possible prosecution.

An area with one of the greatest potentials for savings in reducing premium fraud, according to the Conning & Company study is workers' compensation insurance. Workers' compensation insurance is purchased from an insurer by employers (policyholders) to compensate their employees (claimants) for medical and/or disability expenses should an employee suffer a work-related injury.

Fraud and abuse in workers' compensation insurance may be committed by a claimant (exaggeration of injury, malingering, drug-abuse, double-dipping, etc.), employer (misrepresentation of payroll and employee class codes), or health care provider (over-servicing, collusion with claimant, etc.). Over the ten-year period from 1985-1994, 36% of property-casualty insurance fraud was in workers' compensation claims totaling about $5.9 billion per year. A significant portion of that total consists of premium fraud. A study by the California Department of Insurance found, that losses on premium fraud can and usually do exceed the amount of loss on claimant fraud and, in some instances, provider fraud.

The motivation for employers to commit premium fraud by misrepresenting payroll information is significant because insurance premiums form a substantial share of an employer's total cost, directly reducing overall profitability of the company.

Typically, the premium for a workers' compensation policy depends on:

The job classifications of the policyholder's employees. The rates for the classifications vary according to the risk of accident and injury in each type of work.

The amount of payroll paid to workers in each classification. Employers report to their insurers the amount of payroll in each job classification on a form called a payroll report.

The injury rate in the policyholder's establishment compared with other employers in the same industry. Workers' compensation insurers typically seek to reward employers who consistently operate safer-than-average businesses with lower premiums and to assess higher premiums from employers who operate businesses with higher-than-average injury rates. To achieve this goal, policyholders receive experience ratings, either from a rating bureau (such as the experience modification from the National Council on Compensation Insurance (NCCI)) or directly from an insurer (sometimes called a Safety Record Discount). These ratings are used to scale the policyholder's premium up or down, depending on that employer's historical injury rate compared with other firms in the same industry.

There are a variety of techniques by which an employer can misrepresent policy information in the context of worker's compensation insurance:

The workers' compensation premium for an employee is proportional to his or her salary; an employer can thus reduce premiums by under-reporting payroll figures.

Additionally, premium rates vary greatly by occupation providing an incentive to misrepresent employees occupations Consider an individual with an annual income of $50,000. A typical premium for insuring a construction supervisor at that salary is approximately $300 (class code 5606), while a typical premium for a roofer with that salary is about $11,000 (class code 5551). Fraudulently claiming the roofer as a supervisor would result in significant premium savings to the employer. If that would be too suspicious, then the employer could claim the roofer as an electrical wiring installer (class code 5190), and reduce the premium to less than $3,000, still a substantial savings.

An employer can hide a poor claims history by closing the company and re-opening it with a new name. This action effectively resets their experience rating to a neutral position (a multiplication factor of one) thereby avoiding detrimental experience modification of the premium.

Substantial reductions in premium can be achieved through these types of fraud. While these examples are particular to workers' compensation, there are analogous acts of misrepresentation in other areas of insurance. For example, misrepresenting a driving record or the identity of the primary driver on an auto policy application.

The Auditing Department of an insurance company is the front line of defense in detecting insurance fraud and abuse, including premium fraud and abuse. There are typically two types of audits—field audits and desk audits. A field audit involves the auditor visiting the policyholder and personally inspecting the facilities and books of the policyholder to confirm policy information and identify any misrepresentations. A desk audit is based on a review of documents requested from the policyholder. Many insurers are trending to an increasing number of desk audits, first to handle an increasing number of audits generally, and because they are easier and less costly to conduct. However, they are also more open to manipulation by the policyholder than are on-site field audits.

Historically there have been no automated statistical-based tools that assist auditors in identifying the most suspicious policies for auditing. Accordingly, it is desirable to have an automated system that uses available information regarding policyholders to analyze insurance policies, and periodically highlight policies that are likely to be engaged in premium fraud by misrepresenting information provided to the insurer. Such a system should enable the insurer to prioritize policies for auditing or investigating and should capture a relatively high proportion of the frauds while maintaining a relatively low false-positive rate (a false-positive is a policy that scores high but is not fraudulent). The effectiveness of such a system depends upon its ability to handle a large number of interdependent variables. In addition, the long-term effectiveness of such a system depends on the capacity for redevelopment of the underlying detection techniques as new patterns of fraudulent behavior emerge.

SUMMARY OF INVENTION

The present invention is designed to provide these desired features by applying advanced analytical and statistical methods in the context of an automated system to identify those policies most likely to be misrepresenting policy-related information in order to reduce the premiums they pay (i.e., committing premium fraud). The present invention includes automated systems, methods, and software products that identify the likelihood of premium fraud for each policy. The system derives variables that capture relevant features about the policyholder or its claimants. These variables are analyzed using detection methods such as models and rules for patterns indicative of fraudulent conduct. It should be noted here that "fraud" is used in a general sense as a shorthand for misrepresentation of policy information whether intentional, negligent, or merely accidental.

The present invention is able to identify likely premium fraud and abuse suspects by learning to distinguish patterns that indicate an honest (non-fraudulent) policy from patterns that indicate a fraudulent one. These patterns can be highly complex, involving interactions among many characteristics of the policyholder, activities, and claims. In one embodiment, the present invention includes a predictive model that is trained to recognize these intricate patterns using historical examples of honest, fraudulent, and indeterminately classified (i.e., unknown whether fraudulent or not) policies. More particularly, the predictive model is trained to recognize these patterns using information about the policyholder, information comparing the policy with policies of peer policyholders, and information comparing the policy with itself in a previous time period. The predictive model is further trained to consider peer group risk measures which describe the risk of a policy being fraudulent because it is in a particular peer group. The predictive model is further able to prospectively determine premium fraud by applicants for insurance policies; accordingly, "policyholder" is understood to include applicants for insurance policies.

When a policy is presented to the predictive model, the information about that policy is compared with the patterns of honest and fraudulent policies that the model has learned and the model then assesses the likelihood that the policyholder has misrepresented information about the policy to the insurer. A key characteristic of a statistical model (in contrast to a simple set of guidelines for spotting fraud and abuse) is that the model assesses all aspects of the policy simultaneously and considers their interactions. In this way, a statistical or predictive model can achieve a level of complexity in its analysis, accuracy in its assessments, and consistency in its operation that would be nearly impossible for the human brain.

Referring to FIG. 2 there is now shown a conceptual diagram of how the predictive model detects premium fraud. The collection of insurance policies upon which the predictive model is developed form a complex multi-dimensional "policy space" 201, which contains all of the policies that will be evaluated by the predictive model. Each policy is described by many policy variables. These policy variables generally fall into three categories of variables: over-time policy variables. 203, peer group variables 205, and internal policy variables 207. It is this collection of policy variables that describes each policy in the policy space 201. In general, many of these variables may be understood as measures of the amount, distribution, or nature of the activities or characteristics of the policyholder and its claimants as indicators of premium fraud risk.

The peer group variables include peer group comparison variables and peer group risk variables. Peer group comparison variables compare a policy with one or more peer groups into which the policy is categorized. The peer group comparison variables may be distance measures that describe how far a particular policy is from a peer group average or norm. For example, in the context of workers' compensation insurance, peer group comparison variables may compare the distribution of payroll (i.e., percent of payroll in each of a number of job classifications) in the policyholder's business with the payroll distribution in other businesses in the defined peer group. Any useful statistical comparison measure may be used, such as Z-score, dot product, L1 or L2 norms, or the like.

Peer group risk measures describe the risk of fraud in the policy that comes from the policy being in one, or preferably multiple, peer groups. For example, certain industry groups (whether defined by SIC codes, NCCI codes, or other classification schemes) pose a higher risk of fraud than others. This risk measure is calculated based on historical experience with policyholders in the different peer groupings. When a new policy is being evaluated, it is categorized into one or more peer groups, and the risk measures for these peer groups are obtained and used as inputs to the predictive model.

Over-time policy variables compare policy data for the policy during a selected time period with similar policy data in a prior time period (or periods). Changes in the policy data may be indicative of fraudulent behavior. Over time policy variables may be expressed as percentage changes, distance measures, rates of change, or the like. In the context of workers' compensation, an over-time variable may compare the policyholder's current payroll distribution with its payroll distribution in a previous time period.

The peer group variables and over-time variables may also compare the claim experience of the policyholder with its peers or with itself. For example, they may compare a policyholder's claims with previous claims or with an average number of claims filed by peer group policyholders, or with the policyholder's claims in a prior period.

Internal policy variables are those that are directly reported by the policyholder (or derived therefrom), and which are evaluated in and of themselves (or in combination) as potential risk factors. For example, internal policy variables include such factors as the age of the policy, the corporate form of the policyholder and the number of cancellations on the policy, and the like.

The predictive model evaluates all of these types of variables for each policy. Some of these policy variables are obtained from the raw policy data provided by the policyholder, some are derived (i.e., calculated) from such raw data, and some are derived from statistical data which has been collected for various peer groups that the policyholder or policy may fall into.

Within the policy space 201 is a range 209 of policy variables that describe typical, non-fraudulent policies. This range was learned by the predictive model during model development by processing many examples of insurance policies which have been classified as either fraudulent or non-fraudulent. When the predictive model evaluates a new policy, it looks at all of the policy variables together and determines the degree to which the policy is similar or dissimilar to policies in the typical policy range 209. The predictive model assigns a score based on the degree of similarity. The more dissimilar a policy is from the range of typical policies, the higher the likelihood of fraud in the policy data. The assigned score expresses the relative likelihood of fraud, so that the higher the likelihood of fraud, the higher score.

Most of the policies look like the typical policies so they are given a low score, since there is a low likelihood that they are fraudulent. Policy A is an example of a policy that looks typical. All of the variables show that its activity measures and attributes are typical with respect to the three general classes of variables. Thus, Policy A is shown fairly near the middle of the typical policy range 209. Accordingly, the predictive model gives Policy A a low score, indicating a low likelihood of fraud.

Some of the policies are near the "edge" of the typical policy space 209. These policies look a bit more suspicious than the ones closer to the middle and receive slightly higher scores. They have a higher likelihood of being fraudulent than the ones that look more typical. Policy D is an example of a somewhat suspicious policy. It is a young policy and has made some significant changes in the distribution of payroll it is reporting this year compared with last year. That combination of factors raises some suspicions—an internal policy factor of being a young policy, and an over-time policy factor of a significant change in payroll distribution—but it is not highly suspicious. The model gives Policy D a medium score of 520.

Policies that are situated further away from the middle of the typical policy space 209, are increasingly suspicious policies. The predictive model gives such policies higher scores. Policy C is an example of a highly suspicious policy. It is a construction firm that reported a high share of its payroll as being paid to clerical workers, which is certainly not typical for a construction company. Thus, Policy C is atypical when compared to the average policy of its peer group of construction company policyholders. Adding to the suspicion is the change in the distribution of payroll into clerical class codes as compared to last year's payroll distribution. Thus, Policy C is also atypical when considering its over-time policy data. This behavior suggests that the owner of the company decided to fraudulently lower his workers' compensation premium this year by misrepresenting what his workers are doing. The model recognizes this pattern of behavior as indicating a very high likelihood of fraud and gives the policy a score of 921.

Given these various scores, the insurer can then rank the policies by their scores, with Policy C having the highest ranking, and then decide which policies to audit and how each audit is to be conducted. These auditing decisions may be based on the particular model scores assigned using thresholds and criteria established by the insurer.

FIG. 3 shows how the model scores from a predictive model can be used to identify policyholders who are likely suspects for premium fraud, and further demonstrates the utility of the present invention. In the figure, each of the bins 1-10 (shown along the horizontal axis) contains approximately 10% of the policies that were scored in a sample analysis. Bin 1 contains the lowest-scoring 10% of the policies and bin 10 contains the highest-scoring 10% of the policies. The graph measures the percentage of policies in each bin that involve premium fraud (called the fraud rate). In the historical sample of policies used in this analysis, the fraud rate was determined by examining audit results on every policy in the sample. The figure shows that the fraud rate is significantly greater among higher-scoring policies than among lower-scoring ones, particularly among the top 30% of policies. In fact, the fraud rate is approximately 25-times greater among the highest-scoring policies (bin 10) than among the lowest-scoring policies (bin 1). This ability of the predictive model to rank-order policies by the likelihood of fraud is of great value because it enables an insurer to catch most of the premium fraud and abuse by auditing only a subset of the policies, (i.e., the higher-scoring policies).

In one embodiment as a fraud detection system, the present invention encompasses the following general processes (each of which is described below):
Policies are presented to the system;
Some policies are selected for analysis for fraud;
Variables are derived to be used in the analysis;
The selected policies are analyzed;
Results are generated indicating the likelihood of fraud in each selected policy; and
Results are made available to users.

Policies may be presented to the system through a fully automated process or through an interactive process. Data on each policy that is presented is checked to select those policies that the system can analyze. The specific data to be considered depends on the type of insurance, but it may include data on the policyholder, activity measures, policy history, claims, audits or investigations, and any other relevant data. An insurer may also manually select policies for review by the system.

In one aspect of the present invention, a scoring period may be defined for the purpose of evaluating the likelihood of fraud, and policies may be selected based on the determination of such a scoring period. The scoring period may be any period of time over which a policy is evaluated for fraud, whether retrospectively or prospectively. A retrospective scoring period is one defined as a past period, such as a previous policy term, previous quarter, year, payroll period or the like, and for which the system seeks to determine if policy was fraudulent during that period. A prospective period is defined in the future (using either estimated future data, or selected past or current policy data) and seeks to predict if the policy is likely to be fraudulent in the future. Policies may be selected for analysis according to whether sufficient data is available for the desired scoring period.

The selected policies are provided to a detection engine that analyzes each policy for indications of premium fraud. This process occurs in two steps First, variables describing the policy and its activities are derived from the data. As noted above, these derived variables include the internal policy variables, the peer group variables, and the over-time variables. These variables may be based on descriptions of the policy, the policyholder, the activities of the policyholder or the persons under the control or supervision of the policyholder, and/or the history of such activities, and generally provide various measures of the activity related to the policy that is being insured.

Once the appropriate variables are derived, they are input into a predictive model. The predictive model has been previously trained to learn the statistical relationships between the derived variables and the likelihood of premium fraud. The predictive model generates a model score indicating the relative likelihood of misrepresentation of policy information leading to premium fraud on the policy. The model score is preferably processed into a fraud score that indicates the likelihood of premium fraud for the policy. Optionally, reason codes for each score (highlighting the most important factors in determining the probability of fraud) and other information that will aid the insurer in using the model scores may also be generated.

Optionally, policies are analyzed by a separate rule-based analysis that applies expert derived rules to the policy data and variables to select policies with indications of premium fraud. These rules preferably identify various significant inconsistencies in the data that are indicative of premium fraud. In workers' compensation insurance, for example, a claim may be filed for an injury sustained by a roofer although the policyholder does not report employing any roofers. The rule-based analysis outputs a red-flag indicator (or a continuous fraud measure, if appropriate), which identifies those policies suspected of misrepresentation of policy information (those that violate the particular red-flag rule). The rule-based analysis may be used to evaluate policies that were not selected for analysis by the predictive model, thus the combination of approaches (predictive model and rule-based analysis) provides a robust assessment of the likelihood of premium fraud.

The scores provided by the predictive model may be scaled to represent actual probabilities of fraud, or to represent an expected (net or gross) adjustment to the premium if the policy is audited.

Once the policies are scored, the present invention enables the users to employ various operational strategies to determine which policies to audit or investigate. These strategies may be based on the model score directly, the scaled scores, the number of audits or investigations the staff can perform, the particular goals of the insurer, the frequency with which they are willing to audit the same policy, and any other concerns or constraints of the insurer. For example, one insurer may wish to catch as many cases of premium fraud and abuse as possible while another wishes to recover as much premium as possible; these two goals would require different usage strategies, the first focusing on the policies with the highest probabilities of fraud, the latter focusing on the policies with the greatest net expected adjustments. The output of the system may be customized to support usage strategies of individual insurers.

The present invention provides a number of advantages over prior insurance premium fraud detection methods. First, the present invention identifies individual policies (through the model scores and rule-based analysis) that have a high likelihood of involving premium fraud or abuse resulting from misrepresentation of policy information by the policyholder. The present invention further can provide explanations of the model scores to help guide the auditing process. The present invention may be easily integrated with existing insurer policy databases and auditing programs, and the present invention allows the insurer great flexibility to develop strategies for using the model scores to select which policies to audit. The present invention facilitates the implementation of a consistent objective throughout the policy audit and investigation process. The present invention learns fraud patterns from historical examples and improves over time as more examples become available. The present invention is easily maintained and updated.

The present invention may be embodied in various forms. One embodiment is a software product encompassing various modules that provide functional and structural features to practice the invention. One software product embodiment includes a database load process which loads policy and, if desired, claim data, into a database conducive to the predictive and rule-based analyses, and which may also store results of the analyses. A policy-selection process retrieves data from the database and selects policies for analysis. The policy-selection process generates a scoring file, containing parameters that may also define a scoring period for each selected policy during which the likelihood of misrepresentation is evaluated. The scoring file is input into a detection engine, which includes a variable derivation process, a predictive model, and an optional rule-based analysis.

The variable derivation process derives from the database the appropriate variables for the selected policies and provides them as inputs to the predictive model and the rule-based analysis. The variable derivation process may use lookup tables to obtain peer comparison variables, which tables contain statistics (e.g., means, standard deviations, fraud rates, etc.,) derived from historical data for selected defined peer groups of policies. The lookup tables may be dynamically updated as the policy data from many different policies changes over time, thereby capturing changes in the risk of fraud presented by differing peer groups.

The predictive model embodies the statistical relationships between the derived variables and the likelihood of premium fraud. The predictive model may be a neural network, a multivariate linear regression model, or the like. The predictive model outputs a model score indicative of the relative likelihood of misrepresentation of policy information. The model score may be scaled into a fraud score providing a measure of the probability of premium fraud for the policy.

The rule-based analysis analyzes the selected policies and may additionally analyze policies that were not selected for scoring by the predictive model. The rule-based analysis identifies policies that exhibit particular contradictions in their data. Each rule outputs a red-flag indicator (yes/no) or a continuous fraud measure for each policy that is analyzed.

A post-scoring process is advantageously used to further enhance the model score information by calculating various score-based measures for rank-ordering policies. For example, an expected net premium adjustment calculation ranks all scored policies based on the size of the adjustment that may be expected from auditing the policies. The post-scoring calculations support a variety of usage strategies by providing the insurer with a number of different measures by which to determine which policies to audit.

Another embodiment of the present invention is a system which includes hardware and/or software elements which cooperate to practice the above described functionality and features. Other embodiments include various methods and processes which execute the present invention or which may be utilized by an insurer to review its policies and select certain policies for audit.

BRIEF DESCRIPTIONS OF THE DRAWINGS

Figure 5:
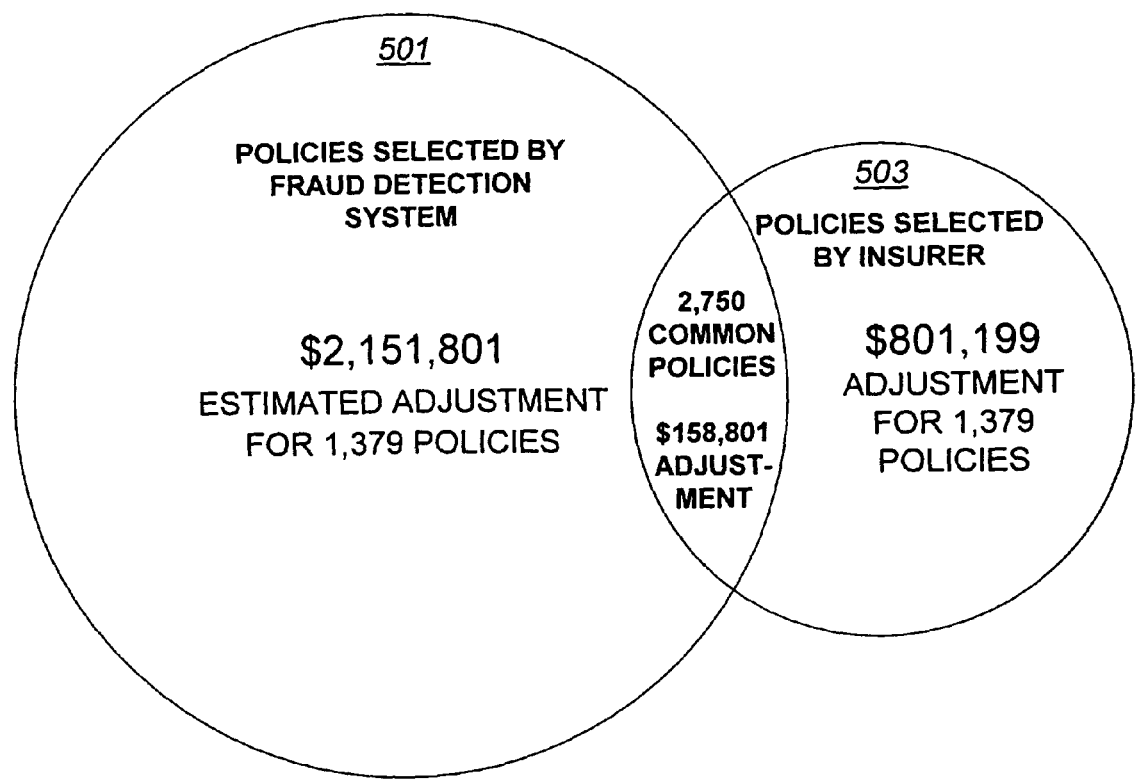

FIG. 5 compares estimated audit premiums collected using the present invention to premiums from a conventional insurer audit.

Figure 6:
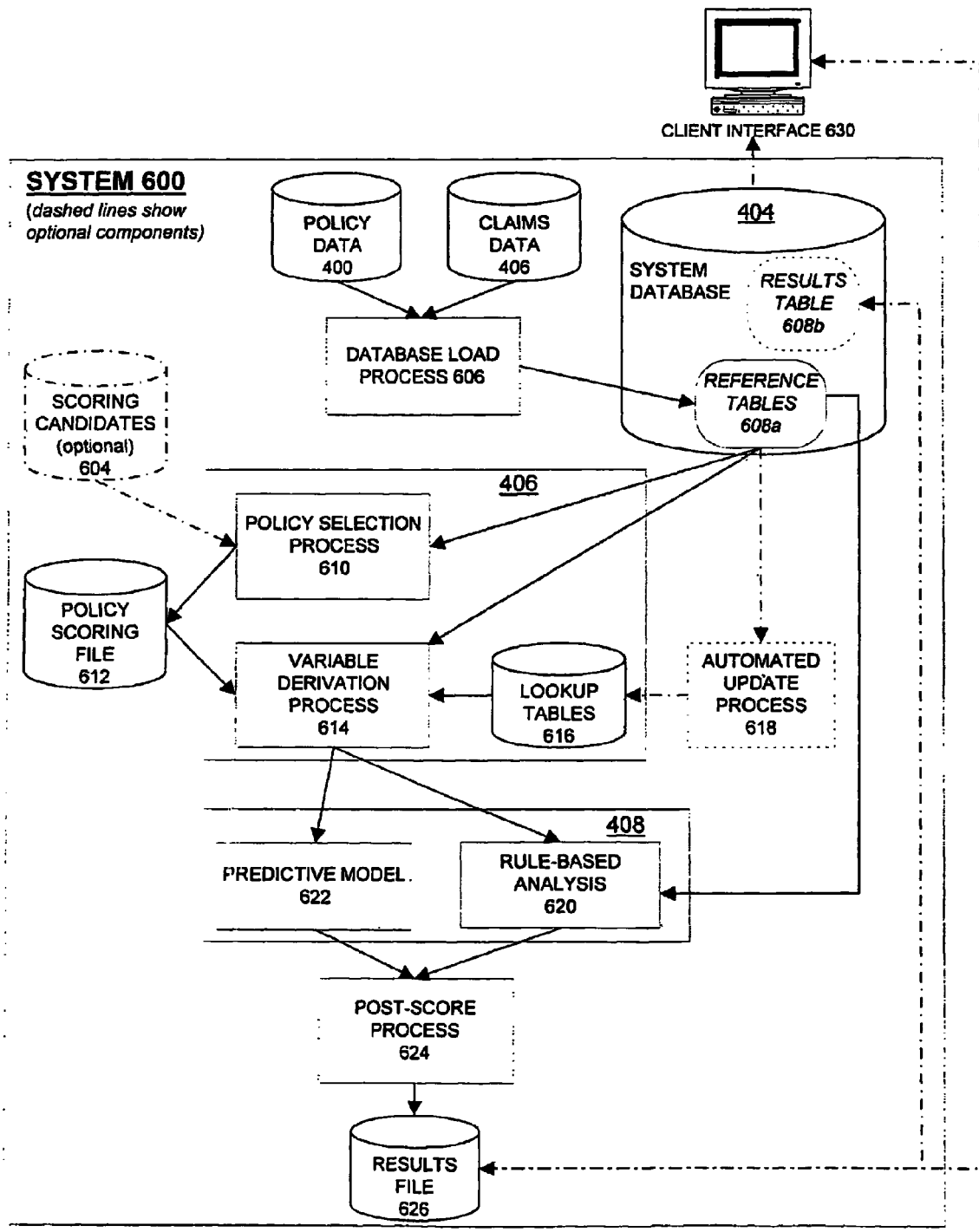

FIG. 6 is a software architecture for one embodiment of the invention.

Figure 7:
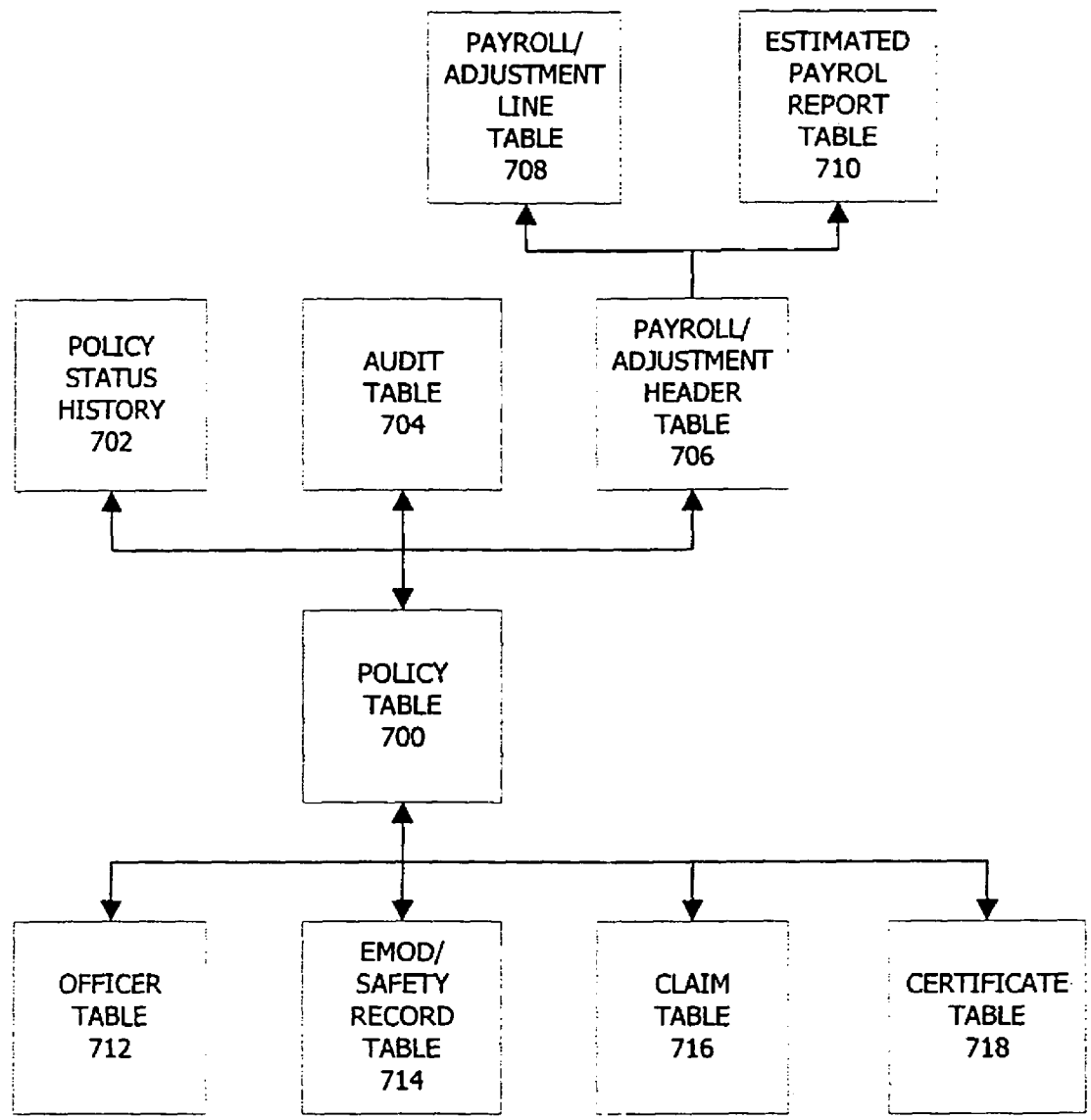

FIG. 7 is an illustration of the data files that comprise the system database.

Figure 8:
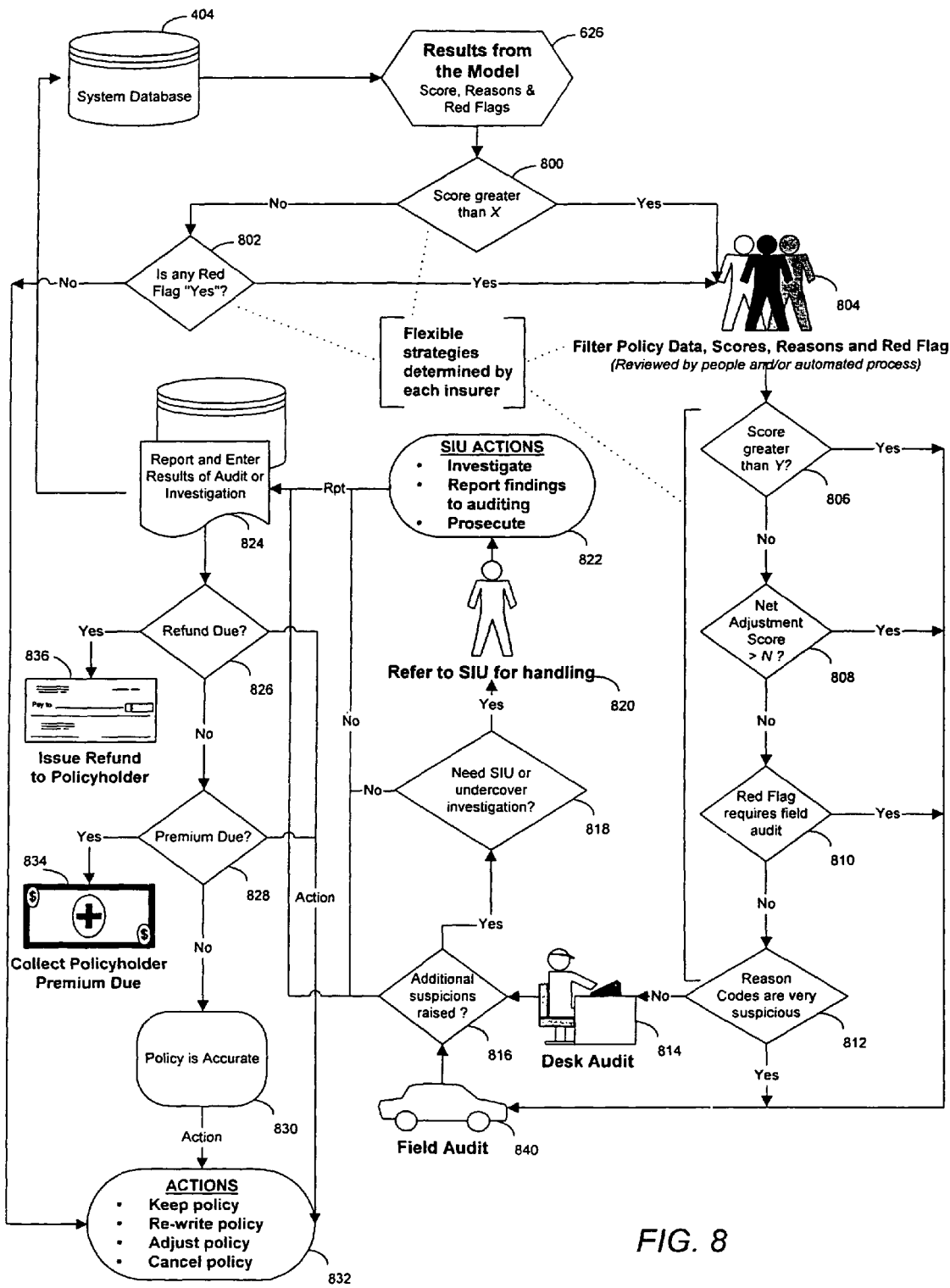

FIG. 8 is an illustration of the audit and investigation workflow using a sample usage strategy for the invention.

Figure 9:
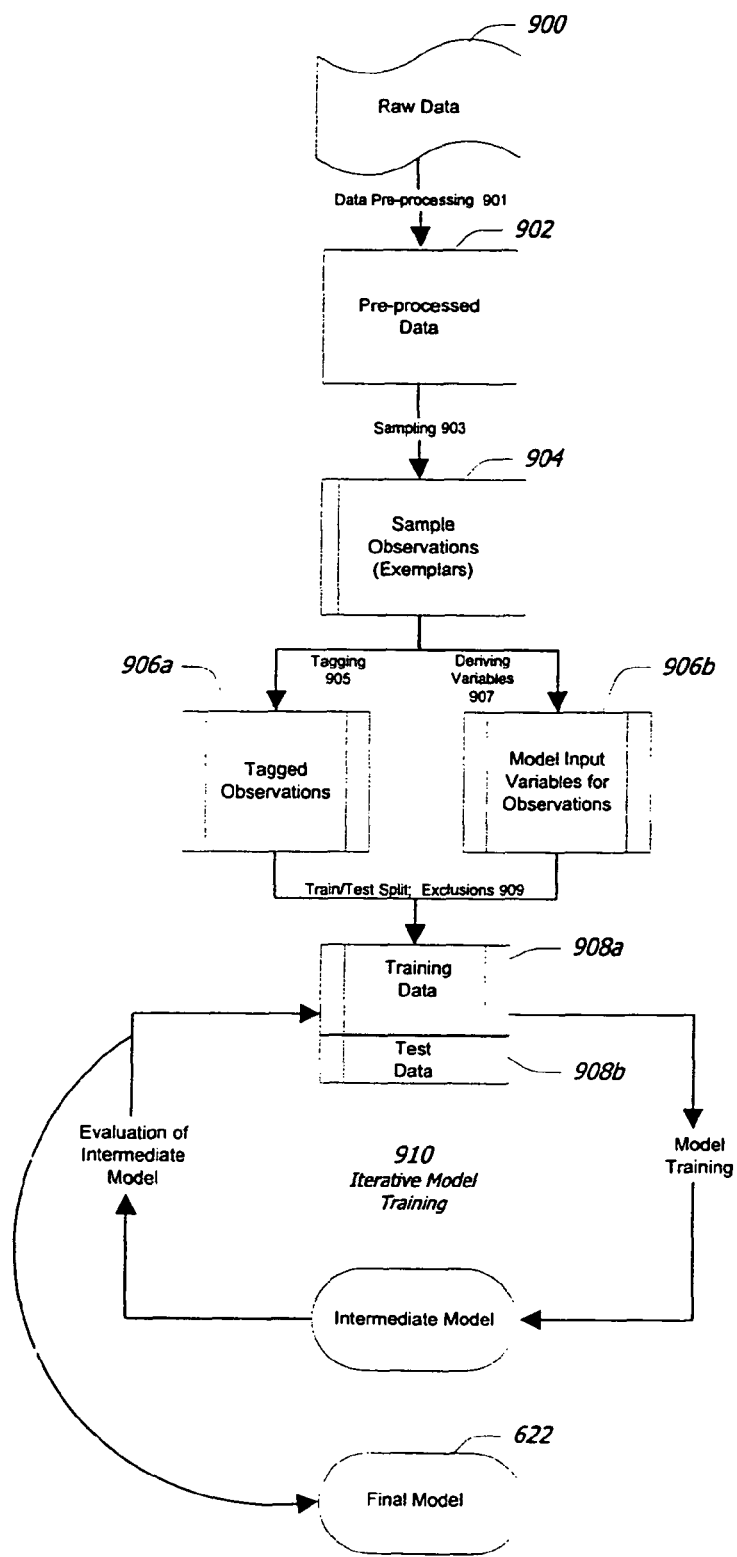

FIG. 9 is an illustration of the predictive model training process.

DETAILED DESCRIPTION OF THE PREFERRED EMBODIMENTS

A. Functional Description of a Premium Fraud and Abuse Detection System

B. Example of Premium Recovery Results

C. Software Architecture

1. DATABASE LOAD PROCESS
2. SYSTEM DATABASE
3. POLICY SELECTION PROCESS
4. POLICY SCORING FILE
5. VARIABLE DERIVATION
6. LOOKUP TABLES
7. PREDICTIVE MODEL
8. MODEL SCORE EXPLANATIONS AND REASON CODES
9. RULE-BASED ANALYSIS
10. POST-SCORING PROCESS
11. RESULTS TABLE

D. Usage Strategies

E. Development of the Predictive Model

1. THE MODEL DEVELOPMENT ENVIRONMENT
2. DATA PREPROCESSING
3. SAMPLING PROCEDURE
4. TAGGING PROCEDURE
5. VARIABLE DESIGN
   a) Policy vs. Claim Variables
   b) Direct Variables
   c) Peer Group Variables
   d) Over-Time Variables 6. VARIABLE SELECTION
7. VARIABLE DERIVATION
8. TEST/TRAIN SPLIT
9. SEGMENTATION
10. MODEL TRAINING F. Alternative Embodiments Appendix A. Specifications of System Data Tables 1. INPUT DATA FEEDS
a) Policy File
b) Policy Status History File
c) Audit File
d) Payroll/Adjustment Header File
e) Payroll/Adjustment Line File
g) Officer File
h) E-Mod/Safety Record History File
i) Claim File
j) Certificate File
2. FRAUD DETECTION SYSTEM GENERATED DATA A. Functional Description of a Premium Fraud and Abuse Detection System In the following description, the present invention is described in the context of an exemplary embodiment for detecting premium fraud in workers' compensation insurance. However, it is understood that the present invention is not limited to workers' compensation insurance, and may be used to detect premium fraud, in other types and forms of insurance.

Figure 4:
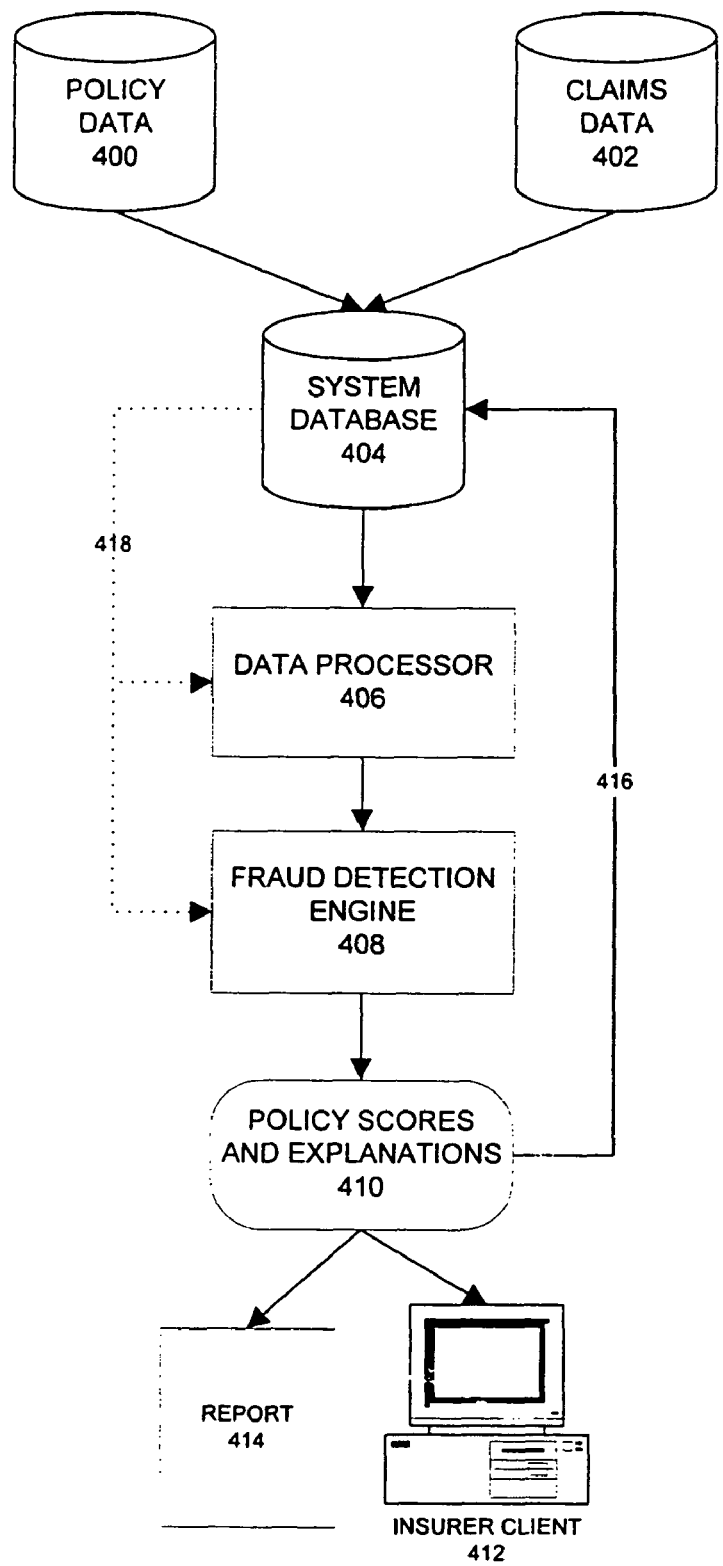
FIG. 4 is a block diagram of the functional operation of the present invention.

Referring now to FIG. 4 there is shown a functional overview of a premium fraud and abuse detection system in accordance with the present invention. The process begins with inputs of policy data 400 and claims data 402 provided by an insurer. The policy data 400 includes information on insurance policies and their respective policyholders; the claims data 402 contains information on claims filed on the policies. The databases are preferably updated as needed by the insurer to ensure accurate and timely data for each of the policies, including timely claim data. This information is received on a periodic basis into a system database 404 where it is appropriately formatted for analysis in accordance with the present invention. There are no restrictions on the frequency of the incremental feeds; they could be done monthly, weekly, daily, or even real-time, depending on the needs of the insurer and the specifics of the type of premium fraud and abuse being detected. For product standardization, it is preferable that the insurer converts the data into a predefined format for input into the system database 404.

For each policy that is included in the system database 404, or on a user-provided subset of those policies, the data processor 406 further selects policies for analysis for premium fraud. If needed, this selection process may establish a period of time (called a scoring period) for which the policy is analyzed. The data processor 406 also derives particular variables from the system database 404 pertinent to the policies selected.

The derived variables are input into the fraud detection engine 408, which applies each policy to a statistically derived model for premium fraud. The model has been previously trained on a sample of policies including both fraudulent and non-fraudulent policies.

In one embodiment, the fraud detection engine 408 uses a neural network. Neural networks are advanced statistical tools that have been proven to be effective in learning, from historical data, the patterns of inputs that are most associated with particular behaviors, such as fraud. Neural networks are especially effective at modeling non-linear relationships between input and output, as well as complex interactions between variables. Other types of predictive statistical models may also be used.

The fraud detection engine 408 outputs a data file 410 that contains a model score for each selected policy. The model score measures the relative likelihood of fraud for the policy. The model score is preferably scaled into a fraud score which is a measure of the probability that the policyholder has engaged in premium fraud during the scoring period. The fraud scores are in a predefined range, such as 0-1000 (or some other useful range), where a higher score indicates a higher probability that premium fraud has occurred during the scoring period. In other embodiments, the model score may be scaled to represent the expected premium adjustment rather than the likelihood or probability of fraud. The actual model score, the fraud score, and the expected premium adjustments are collectively referred to as "scores."

In addition to the model score, the fraud detection engine 408 optionally provides a number of reason codes, or explanations, indicating what aspects of the policy the model deemed most suspicious. Each reason code corresponds to a group of input variables. These explanations assist the auditor when investigating a policy deemed to be suspicious by directing their attention to specific policy-related or claim-related facts and data. In one embodiment, up to five reason-codes are returned with each model score.

In a preferred embodiment, the fraud detection engine 408 also employs an additional rule-based analysis. The rule-based analysis may be used to identify clear-cut cases of potential premium fraud, or to flag suspicious policies not otherwise assessed by the model.

The scores (and explanations, if any) may then be provided to the insurer and its auditors either through direct computer access 412 or through printed reports 414. The scores can be used to focus attention towards those policies that warrant further desk or field audits and away from those policies that are legitimate. Various usage strategies for evaluating the identified policies are supported by the present invention, as further described below under Usage Strategies.

The scores and explanations are also stored 416 in the system database 404 for future use. Finally, based on the periodic updates to the system database 404, the data processor 406's variable derivation process may be updated 418 to reflect changes in the value of global statistics used to create the input variables (see Peer Group Variables for a detailed description). The fraud detection engine 408 may be likewise periodically updated.

In the particular context of workers' compensation insurance, the model score is based on an evaluation of an employer's reported payroll along with other information about the policy, including claims filed. Since much of this information changes only periodically, most workers' compensation insurers are unlikely to select a scoring cycle (for re-scoring all policies) more frequent than weekly or even monthly. For other types of insurance, a different scoring cycle may be appropriate.

The scoring cycle may be adjusted by the insurer, as necessary. For example, in workers' compensation insurance, during certain times of high activity when many new payroll reports are being received from employers, more frequent scoring can be beneficial. High-activity cycles differ in cause and timing depending on the type of insurance.

B. Example of Premium Recovery Results

An example of the benefits of the fraud and abuse detection system is now described. A simulation was performed on 23,763 actual workers' compensation insurance policies. The insurer had selected 4,129 of these policies for auditing using its own selection criteria, and not the system of the present invention. Of these 4,129 policies, 254 had negative adjustments, 294 had positive adjustments, and 2,381 had no change to the premium. The net adjustments on these policies totaled $960,128.

A simulation was then performed in which the present invention was used to select policies for auditing. FIG. 5 compares the policies selected by the system with those selected by the insurer. First, it was assumed that the number of audits performed would remain unchanged, so the top-scoring 4,129 policies were reviewed (the same number of audits as the insurer had selected previously). Of those policies chosen by the model, 2,750 policies matched with policies that had been audited by the insurer. For these 2,750 common policies, the adjustment that resulted from the audit was known, and was $158,199.

Taking out the common 2,750 policies leaves 1,379 policies selected by the present invention as compared to 1,379 policies selected by the insurer. For the 1,379 polices selected by the insurer, the net adjustment was $801,199. For the 1,379 policies selected by the present invention, but not by the insurer, the adjustment was estimated based on the audit results from similar policies. This estimated adjustment was $2,151,801. In other words, the policies selected by the predictive model of the present invention provided an estimated 268% more premium over the same number of policies selected by the insurer using conventional auditing criteria.

The estimate of net adjustments on the new mix of policies totaled $2.31 million. That is, by using the expected net adjustment rank to select policies for auditing, the insurer could have collected an additional $1.3 million of premium (over the amount collected without using the scores) while performing the same number of audits (4,129).

C. Software Architecture

Referring now to FIG. 6, there is shown an illustration of the software architecture for a system 600 for practicing the present invention. The illustrated features discussed below are those that are utilized to detect premium fraud and abuse.

The system 600 includes database load process 606, system database 404, policy selection process 610, variable derivation process 614, lookup tables 616, predictive model 622, rule-based analysis 620, and post-scoring process 624. Relative to FIG. 4, the data processor 406 comprises the policy selection process 610, the variable derivation process 614 and lookup tables 616; the fraud detection engine 408 comprises the predictive model 622, and the rule-based analysis 620. The system database 404 is accessible through a client interface 630 that enables the insurer to access the results data of the predictive model and rule-based analysis. These various components are preferably provided in a suite of software modules that together form one or more software products.

1. Database Load Process

The policy database 400 and claims database 402 are used as the data source for the system database 404, but their particular formats and contents are expected to vary for different types of insurance (and possibly for different insurers in the same line of insurance) and are not material to the invention.

When the system 600 is initially deployed, an initial data load from databases 400 and 402 is fed into the system database 404 through the database load process 606. This initial data load includes historical data up to the date of system deployment. On an ongoing basis, new (incremental) data from the policy 400 and claims 402 databases are periodically loaded into system database 404 in order to keep the system database 404 up to date.

Each record loaded into the system database 404 from the policy or claims databases is subjected to a primary key constraint check before it is added to the database 404. If there is a primary key conflict, i.e., a record with a matching primary key (such as policy number) already exists for that table, then the new record updates the existing record. Otherwise, the new record is inserted. The specific primary keys for each table are given below in the System Database section. Note that some tables do not have a primary key defined, in which case all new records are simply inserted.

2. System Database

The system database 404 is structured into a useful arrangement of reference tables 608a that are used as the data source for the detection of premium fraud and abuse. In addition, the system database 404 optionally includes a results table 608b, which is used to store the model scores and explanations in association with their policies. Generally, the tables are organized around the insurance policies so that pertinent data for any insurance policy can be easily looked up or retrieved given a policy number or other keys.

In an embodiment of the system 600 directed at workers' compensation premium fraud, the reference tables 608a consist of the following ten tables, which are illustrated in FIG. 7. Appendix A provides a detailed example of one possible format for these tables. Obviously, for other embodiments directed to premium fraud in other types of insurance, different tables would be used as appropriate.

The Policy Table 700 contains a current snapshot of each policy. It contains information about the policy: policy type (term or continuous); policy status; and policy dates (effective date, expire date, cancel date). It also contains information about the policyholder: company type (corporation, sole proprietorship, etc.); SIC Code; business description; and addresses. The primary key for the Policy Table is Policy Number and Reinstate/Renewal Number.

The Policy Status History Table 702 contains information on the status of each policy (tracking changes in status) and on 30-day notices that are sent for late payment for each policy. For cancellations, it also contains the reason for the cancellation. Information on notices for late payment and cancellations for late payment are useful for identifying policyholders who may be experiencing financial difficulty. All incoming policy status records are inserted into this table.

The Audit Table 704 contains identifying information about any audits performed on each policy. It includes the type of audit, dates and any adjustment that resulted from the audit, and the ID of the auditor. The primary key for the Audit Table is Policy Number and Audit ID.

The Payroll/Adjustment Header Table 706 contains high-level information about payroll reports and audit adjustments for each policy. It contains the dates covered by the payroll report or audit, information about the policy (such as the policy type, SIC Code, and experience modification rate), and for audits, the type of audit and total adjustment. All incoming payroll/adjustment header records are inserted into this table.

The Payroll/Adjustment Line Table 708 contains detailed information about the payroll reports and audit adjustments for each policy. There is a set of entries in this table for each payroll report or audit in the Payroll/Adjustment Header Table 706. For each job class assigned to a policy, this file contains: the class code; its description; the rate used to calculate the premium for that class code; the reported basis amount for that class code (e.g., the amount of payroll); the reported premium amount for that class code; and any adjustment factors for the premium. For audits, it also contains the audited amounts for each class code.

The Estimated Payroll Report Table 710 is an optional table that contains estimated payroll report information for the coming year for each term type policy. The information is much like payroll report information from the Payroll/Adjustment Line Table 708 except that it is an estimate of future payroll rather than a report of payroll that has already been paid. This table is preferably used for embodiments for underwriting analysis (new policies or renewals), where actual payroll data for a future period for which the policy is being underwritten is not available, and thus estimated payroll for the future period is used.

The Officer Table 712 contains information on the officers of each policyholder company. It includes the officer's name, title, relevant dates, social security number, and an indicator of whether the officer is covered by the workers compensation policy. The primary key for the Officer Table is: Policy Number, Officer ID, Officer Start Date, and Coverage Effective Date.

The EMOD/Safety Record Table 714 contains information on the safety ratings that have been applied to each policy to discount the premium. It includes the experience modification rate (emod) or Safety Record Discount multiplier and the dates during which that multiplier applies to the policy. The primary key for the Emod/Safety Record Table is: Policy Number, Rate Flag, and Effective Date.

The Claim Table 716 contains a record of any workers' compensation claims that were filed under each policy. It provides background information on the claimant, including date of birth, age, job class code, and date hired. It also contains information about the injury, including the accident code, injury type, body part affected by the injury, and ICD-9 code. The primary key for the Claim Table is the Claim Number.

The Certificate Table 718 contains a record of the certificates that the insurer issued for each policyholder and the relevant dates. A certificate is issued when a policyholder needs proof of insurance coverage as a condition for accepting a job contract. The primary key for the Certificate Table is Policy Number and Certificate ID Number.

3. Policy Selection Process

In order for the system 600 to determine the probability of premium fraud, it must first select the policies to be analyzed by the predictive model 622; this is primarily done by the policy selection process 610. The system then accepts policies for consideration, makes certain determinations about them, and records its conclusions in the policy scoring file 612. In one embodiment, all policies that are considered by the policy selection process 610 are included in the policy scoring file 612. Those that are excluded from scoring by the predictive model 622 are identified in the policy scoring file 612 with an exclusion code indicating the reason the policy was excluded from scoring. The exclusion code is helpful to allow the insurer to obtain additional information about the policy if desired, or pursue other actions with regard to the policy. Additional selection criteria may be imposed by the variable derivation process 614 to further limit which policies are analyzed. The rule-based analysis 620 may analyze a policy even if the policy selection process 610 or variable derivation process 614 excluded that policy from being scored. In the rule-based analysis, the policy selection is performed individually by each rule.

One type of selection criteria selects a policy for scoring if a valid scoring period can be defined for that policy. The scoring period is the time over which the system evaluates whether misrepresentation has occurred. Since the acts of providing false or inaccurate policy information typically take place over some period of time (e.g., multiple payroll periods as reported by the policyholder), the scoring period has different starting and ending dates. Certain information about the policy must be well defined with respect to the scoring period in order for the predictive model 622 to score the policy for misrepresentation of information.

In an embodiment of system 600 for workers' compensation premium fraud and abuse detection, and likely in other embodiments as well, the policy selection process 610 applies a number of selection criteria to identify policies that have sufficient data for defining a valid scoring period. Specifically, this requires policies to have complete and consistent data within a scoring period given by a start date and end date. Policies for which a valid scoring period cannot be defined are preferably excluded from scoring by the predictive model and identified in the policy scoring file 612 with exclusion codes.

In one embodiment for workers' compensation insurance, the scoring period is a 12-month period. For term policies, this translates to the last expired 12-month term; for continuous policies, this translates to the most recently completed 12 months. The scoring period moves each time new policy data is reported, for example, when a new payroll report is recorded. In this embodiment, the selection criteria for defining a scoring period are as follows:

A policy must be active long enough for sufficient data to accumulate, for example one year or one term.

The data during the scoring period must be consistent, and without any serious integrity problems (e.g., there cannot be two payroll reports for the same period of time).

The data during the scoring period must be sufficiently complete, not containing any lengthy gaps. The total length of any gaps should be relatively short compared to the length of the scoring period. In this embodiment, the total length cannot exceed 15 days out of a one-year scoring period.

In order to summarize the information within the scoring period, the data during the scoring period must be contained; it must not include any payroll report adjustments that spill over the borders of the scoring period.

The output of the policy selection process 610 is the policy scoring file 612 which identifies the policies to be scored and those that are excluded from scoring. If the period is a scoring period, the start and end dates of the scoring period are also recorded in the scoring file 612. Otherwise, the point in time for which the entity is being scored is recorded in the scoring file 612.

Additional policy selection may be performed by the variable derivation process 614. This occurs if it is necessary to derive some of the variables in order to determine whether a policy is eligible for scoring. For example, in a workers' compensation insurance embodiment, variable derivation process 614 imposes the additional criterion that the total payroll during the scoring period must be greater than zero. A policy cannot be checked on this criterion until total payroll is calculated as part of the variable derivation process 614. The criterion is necessary because variables based on payroll distribution cannot be meaningfully calculated if total payroll is zero or less than zero. Also such policies are special cases that may not be of interest to the insurer unless there is some clear-cut problem; thus they are best handled by the rule-based analysis. If the total payroll during the scoring period is zero or less than zero, variable derivation process 614 assigns an exclusion code to that policy.

The policy selection process 610 can support three operational modes:
- fully automated batch mode;
- fully user-controlled mode; or
- semi-automated mode.

In fully-automated batch mode, the policy selection process 610 analyzes each policy in reference tables 608d. For each policy, it determines if a scoring period can be defined. In one embodiment of the invention, the policy selection process 610 checks each policy to see if a scoring period can be defined that meets the criteria described above and has an end date within the previous year. If a scoring period can be defined, the policy selection process 610 records the scoring period's start and end dates in the policy scoring file 612. If no scoring period can be defined, then the policy selection process 610 records an exclusion code in the policy scoring file 612, giving the reason that it was unable to define a scoring period.

In fully user-controlled mode, the user submits to the policy selection process 610 a list of scoring candidates 604 to be considered, including any additional required scoring criteria. In one embodiment, each scoring candidate is a policy along with a user-defined start and end dates for the scoring period for each policy. The policy selection process 610 analyzes each policy on the list and determines whether the user-defined scoring period meets the desired criteria. If the scoring period fails to meet the criteria, an exclusion code is recorded in the policy scoring file 612 indicating that the predictive model 622 is unable to use the scoring period that was submitted. The policy selection process 610 can be configured to suggest an alternate, valid scoring period, if one exists.

In semi-automated mode, the user submits a list of scoring candidates 604 for the policy selection process 610 to consider, but unlike the fully user-controlled mode, no additional scoring criteria are given. The list may be selected manually or by queries to the database, e.g., on any of the fields of the database, using a general database query language, such as SQL. The policies selected (whether by a query or manually) would be processed by the policy selection process 610 to ensure that a valid scoring period was defined. In one embodiment, the policy selection process 610 defines (if possible) a scoring period for each policy submitted (as with batch mode). Also as with batch mode, if no scoring period that meets the criteria can be defined, then the policy selection process 610 records an exclusion code in the policy scoring file 612, giving the reason that it was unable to define a scoring period.

4. Policy Scoring File

The policy scoring file 612 is created by the policy selection process 610 and contains one record for each scoring period that the policy selection process 610 considered. Preferably, each record contains a policy number and an exclusion code indicating whether or not the policy has been excluded from scoring by the predictive model 622. In one embodiment, each non-excluded record is accompanied by a valid scoring period start and end date. The variable derivation process 614 reads and processes the policy scoring file 612 one record at a time, passing each record through the predictive model 622 and, if used, the rule-based analysis 620. Each record passes completely through the post-scoring process 624 and is recorded in the results file 626 before the variable derivation process 614 reads the next record from the policy scoring file 612.

In an alternate embodiment, the policy scoring file 612 only contains policies selected for scoring by the predictive model 622, and does not contain excluded policies.

5. Variable Derivation

The variable derivation process 614 uses the data from the policy scoring file 612 and the system database 404 as well as data from the lookup tables 616 to derive the variables that are used by the predictive model 622 and that may also be used by the rule-based analysis 620. The variables for which values are derived have been previously selected during a training phase as being statistically correlated with premium fraud. The variable derivation process 614 processes each policy in the policy scoring file 612 individually (one at a time), drawing on data in the system database 404 as needed, and passes the results for that policy to the predictive model 622 and the rule-based analysis 620.

In one embodiment, the variable derivation process 614 does not operate on policies that received an exclusion code during the policy selection process 610. The predictive model 622 also does not operate on these policies, but some of the rules in the rule-based analysis 620 may In addition, the variable derivation process 614 may impose exclusions beyond the general exclusions that were imposed by the policy selection process 610. These additional exclusion codes may cause either the predictive model 622 or some or all of the rules in the rule-based analysis 620 not to operate on the policy. Each policy, whether or not any operations have been performed on it, is recorded in the results table 608b.

During the variable derivation process 614, various lookup tables 616 may be employed to obtain values for global statistics that are based on historical data. For example, the lookup tables 616 may store values for peer group risk variables associated with one or more different classifications of policyholders or claimants into peer groups. The values are retrieved from the lookup tables 616 by looking up the appropriate value given the an applicable peer group risk value for the policy. Preferably, a given policy is classified as being in multiple different peer groups, with respect to various classification schemes. Thus, a policy may have an SIC peer group, an NCCI peer group, a peer group based on corporate legal form, a peer group based on policy age, and a peer group based on geographic location. The variable derivation process 614 may obtain the appropriate peer group risk variable for each of the peer groups of the policy.

The lookup tables 616 may be subject to an automated update process 618 by which data from the policies is used to refine and update the values of the statistics in the tables. The lookup tables 616 and the variables created by the variable derivation process 614 are further described below under Variable Design.

6. Lookup Tables

The lookup tables 616 contain statistical information related to certain factors or variables. These tables are used in the variable derivation process 614 to provide the peer group risk measures for a particular policy or to provide statistics used to calculate peer group comparison variables for a given policy. Each lookup table uses a certain category or variable relative to a peer group classification scheme (e.g., SIC codes, NCCI codes, Zip codes) as its key and contains estimates of certain statistics determined from historical policy data. Each row of a table corresponds to a different value for that category or variable (e.g., different SIC code) and contains the statistic corresponding to that value. These tables are used to compute risk variables and peer group comparison variables for any given policy. These types of variables are further described below under Variable Design.

Typical examples of the lookup tables contained in a workers' compensation embodiment of the invention include:

Peer Group Risk by Company Type Each row of this table contains the fraud risk associated with a given value of Company Type (see Equation 4 below for an example). Company types describe the corporate legal form of an enterprise, and may include, for example, corporation, government entity, joint venture, partnership, and sole proprietorship.

Average and Standard Deviation of payroll share in any NCCI Industry Group by SIC Code Each row of this table contains estimates of the average and standard deviation values of the payroll share in the specified NCCI Industry Group for a given value of SIC Code. Examples of NCCI industry groups are construction, clerical, and government. The NCCI industry groups are based on the rates given by NCCI for each SIC class code the rate that an employer would pay to cover $100 of payroll in that class code. Groups are defined based on the rates (e.g., all class codes with a rate of <$2, class codes with a rate between $2 and $4, and so on).

The statistics in the lookup tables 616 are calculated from historical data about the behavior of policyholders. Over time, as more historical data accumulates in the system database 404, the lookup tables 616 may be updated. Updating can occur in two ways. New tables can be calculated outside of the system and installed manually or tables can be updated by the system dynamically by automated updated process 618.

If the lookup tables are updated manually, such updates are performed as needed to keep the statistics current with changing patterns of fraud or other changes in the data. For example, in workers' compensation insurance, if patterns of fraud shifted such that employer fraud became much more common in some industry than it was previously, then it would be necessary to update the industry risk tables. The need for manual updates may be determined by monitoring fraud patterns and/or the results of the predictive model 622 or a reasonable updating schedule based on past experience may be adhered to. Alternatively, the tables may be updated dynamically on a constant basis via recursive update formulae.

7. Predictive Model

The input variables created by the variable derivation process 614 are input into the predictive model 622 and into the optional rule-based analysis 620 if one is included. These modules of the fraud detection engine 408 identify suspicious policies in two ways: by the predictive model 622; and by the rule-based analysis 620 if that process is included.

In general, the predictive model 622 accepts the policy scoring file 612, assesses each policy in that file for suspicion of premium fraud and provides a model score or other value describing the relative likelihood of fraud on each policy. The model scores are derived such that the greater the likelihood of fraud on a policy, the higher the model score. This analysis is performed on each policy for which a valid scoring period has been defined, as identified in the policy scoring file 612.

In one embodiment, the predictive model 677 is a single back-propagation neural network that uses a selected group of input variables derived by the variable derivation process 614, and outputs a model score for each policy. This embodiment may be developed using any standard neural-network training package or Database Mining® Marksman from HNC Software, Inc. of San Diego, Calif.

In one embodiment, the predictive model 622 is trained using samples of policy and claim data from one insurer. This is called the custom model approach. This training of the predictive model 622 using policies of that insurer makes the predictive model 622 sensitive to the particular fraudulent or non-fraudulent behaviors of the policyholders of that insurer, thereby providing a more accurate analysis of that particular population. In an alternative embodiment, the predictive model 622 is trained on a large variety of policies from multiple insurers. This is called the consortium model approach. The predictive model is then generally used unmodified by each new insurer for assessing its policies. This approach creates a more robust model because it has the advantage of being trained on more (and often more varied) examples. Also, the statistics in the lookup tables are more stable because they are derived from a larger sample. Finally, a consortium model approach provides for rapid deployment of the system with each new insurer.

8. Model Score Explanations and Reason Codes

For each scored policy, the predictive model 622 preferably determines one or more input variables (or classes of variables) which most strongly contribute to the model score, and outputs an explanation, in the form of a reason code, which identifies this variable in conjunction with score. The identification of significant variables and reason codes may be done in accordance with the principles disclosed in U.S. Pat. No. 5,745,654, which is incorporated herein by reference as necessary.

The variables used by the predictive model 622 may be grouped, via various statistical techniques (e.g., sensitivity analysis and automatic variable selection), into a number of categories, each of which is associated with an explanation as to the nature of the variables. In one embodiment for workers' compensation insurance, 19 categories are defined as listed in Table 1. Each category corresponds to one or more variables that capture some related concept. These categories are then used for the explanations provided with the model scores, by outputting the reason code associated with the category.

TABLE 1

Premium Fraud Variable Categories for Workers' Compensation

| Reason Code | Short Description | Long Description |
| --- | --- | --- |
| Policy Data | | |
| 1 | Number of Class Codes | Number of class codes on this policy increases the level of suspicion. |
| 2 | Company Type | The legal structure of this company increases the level of suspicion. |
| 3 | Age of Policy | The duration of this policy increases the level of suspicion. |

TABLE 1-continued

Premium Fraud Variable Categories for Workers' Compensation

| Reason Code | Short Description | Long Description |
|---|---|---|
| 4 | Payroll or Premium Size | Premium or Payroll size of this company increases the level of suspicion. |
| 5 | Industry Type/SIC Code | The SIC code of this policy increases the level of suspicion. |
| *Payroll Data* | | |
| *Payroll Distribution* | | |
| 6 | Distribution of Payroll | The distribution of payroll among the various class codes on this policy makes it more suspicious. |
| 7 | Payroll Share in Lower Rate Class Codes | The payroll share of this policy in lower rated class codes makes it more suspicious. |
| 8 | Combination/Characteristics of Class Codes | The combination and/or characteristics of class codes on the policy increase the level of suspicion. |
| *Payroll Change over Time* | | |
| 9 | Change in Distribution of Payroll | The change in payroll distribution over time increases the level of suspicion. |
| 10 | Change in Exception Group Payroll Share | The payroll share of the policy in the Exception class codes makes it more suspicious. |
| *Payroll Share (Specific)* | | |
| 11 | Payroll Share in the Industry Group: Agriculture | The payroll share in the Agriculture Industry Group makes this policy more suspicious. |
| 12 | Payroll Share in the Industry Group: Construction | The payroll share in the Construction Industry Group makes this policy more suspicious. |
| 13 | Payroll Share in the Industry Group: Construction/Manufacturing | The payroll share in Construction/Manufacturing class codes makes this policy more suspicious. |
| 14 | Payroll Share in the Industry Group: Government | The payroll share in the Government Industry Group makes this policy more suspicious. |
| 15 | Payroll Share in Exception Class Codes | The payroll share in the group of Exception class codes makes this policy more suspicious. |
| 16 | Payroll Share in class code 6810 (clerical) | Payroll share in class code 6810 makes this policy more suspicious. |
| *Payment Data* | | |
| 17 | Number of Prior Cancellations for Non-payment | The number of prior cancellations for non-payment makes this policy more suspicious. |
| *Claim Data* | | |
| 18 | Ratio of Number of Claims to Payroll or Premium | The number of claims compared to the payroll or premium makes this policy more suspicious. |
| 19 | Number of Claims in Scoring Period | The number of claims in the scoring period makes this policy more suspicious. |

Observe that the variable categories encompass a wide array of properties of the policy. The policy reason codes (1-5) are based on an analysis of the company and policy characteristics. The payroll distribution (6-8) and payroll share (11-16) reason codes are based on variables that compare the policy with its peers, for example with other companies in the same SIC code. The payroll change-over-time reason codes (9-10) are based on variables that evaluate changes in the behavior of the company across time periods. Finally, the payment and claim reason codes (17-19) are based on variables that factor in information about claim activity and the payment history of the policy.

Those of skill in the art will appreciate that other reasons and groupings of variables may be used, both within an embodiment for workers' compensation insurance, and obviously in other types of insurance.

9. Rule-Based Analysis

The primary predictive software solution for detecting premium fraud and abuse is located in the predictive model 622. The rule-based analysis 620 provides a complementary type of premium fraud and abuse detection that determines if certain specific conditions exist that would indicate a problem with the policy. Some of the rules in the rule-based analysis 620 may analyze policies that are also scored by the predictive model 622. Other rules may analyze policies that are excluded from scoring.

The rule-based analysis 620 contains a number of "red-flag" rules that identify specific contradictions or problems in the data for a policy that are indicative of misrepresentation of policy information and hence premium fraud or abuse. These red-flag rules are preferably derived from statistical analysis of fraudulent policies for a particular insurer or group of insurers, as opposed to the ad hoc auditing rules conventionally used. Where the predictive model 622 yields a continuous model score for each policy, the rule-based analysis 620 typically provides a red-flag indicator (Yes/No) of whether a policy's data exhibits certain specific signals of premium fraud.

Some rules, however, may provide a continuous measure of the degree to which the rule is violated. For example, a rule may output the ratio of two policy factors when the ratio exceeds a predetermined threshold. For example, suppose an insurer wanted to red-flag policies where the total cost of claims exceeded by some amount the total premiums paid. The appropriate red-flag rule would calculate the value (total claim cost)/(total premiums paid) and would compare that value with a threshold defined by the insurer to be of concern, for example, a value of 2. The rule would return a "No" flag if the ratio were less than that level and would return the ratio if it were greater than or equal to that level.

Some red-flag rules may use data directly from the input tables 608a instead of or in addition to using the results from the variable derivation process 614. Red-flag rules that operate on policies that were excluded from scoring by the policy selection process 610 (and therefore were not acted upon by the variable derivation process) preferably rely strictly on data from the input tables 608a, though in an alternate embodiment, an excluded policy may still have the variables derived from it, which are used in the rule-based analysis. The red-flag rules are customized for each type of premium fraud and may be customized for each insurer. For some red-flag rules it is appropriate to prioritize the policies that violate the rule.

As an example, one embodiment for detecting workers' compensation premium fraud includes five red-flag rules. The red-flag rules identify suspected premium fraud as follows:
1. Policies that have a class code on a claim with an injury date during the scoring period but that class code is not listed on the payroll reports for that policy during the scoring period. The logic here is that it is inconsistent for an injury to occur in a particular job class during a period in which no workers were reported paid in that job class.
2. Policies that report zero payroll during the scoring period but for which one or more certificates were issued during the scoring period. The logic here is that it is inconsistent to have a certificate issued covering a period (indicating that the employer was working on a contract job during that period) and then have no payroll reported during the same period.
3. Policies that report zero payroll during the scoring period but which have a claim with an injury date during the scoring period. The logic here is that a company with zero payroll should have zero workers and therefore should not have a claim.
4. Policies with an officer who is currently or was recently an officer on a different policy and where the new policy has a lower experience modification rate than the previous policy. The logic here attempts to identify policies that may be evading high experience modification rates by closing the company and re-opening it under a new name.
5. Policies that have a class code on a claim for which no premium was reported at the time the claim was opened. The logic here is similar to the first rule, except in this case the job class code is listed on the payroll report but no payroll is reported in that class code. This may imply that the employer is misrepresenting the job classifications of their payroll in order to lower their premium.

Each rule in the rule-based analysis 620 flags any policies that violate the rule. These flags can be used to create lists of violators, which are useful complements to the scores from the predictive model 622. As noted above, in a workers' compensation implementation, policies with zero payroll are not scored by the predictive model 622, so, without the rule-based analysis, suspicious policies in that group would not be evaluated. While the exclusion of such policies from the predictive model 622 is appropriate, it may still be possible to identify suspicious policies in this group, as the above rules demonstrate. Thus, the rule-based analysis 620 provides such analysis, bringing any problem policies with zero payroll to the attention of auditors. The rule-based analysis can also provide valuable additional analysis for policies that are scored by the predictive model 622. For example, a policy with a class code on a claim that is not on the policy might be scored by the predictive model 622, but if nothing else about that policy looks suspicious, it may not score high. The rule-based analysis 620 however would flag such a policy as having a clear-cut, specific problem that is independent of how suspicious the policy looks more generally.

By themselves, the red-flag rules are not an efficient or even very effective method for identifying most premium fraud and abuse because far too many red-flag rules would be needed and the interactions among the various signals of fraud would be missed. In addition, red-flag rules that only provide a Y/N output do not provide a continuous score for rank-ordering cases by suspicion, though for rules that output a continuous measure may be ranked by such measure. However, when there is a clear-cut inconsistency pointing to the need for review, red-flag rules serve as useful complements to the primary detection capability provided by the predictive model 622.

10. Post-Scoring Process

The rule-based analysis 620 and the predictive model 622 pass their respective results to the post-scoring process 624. The post-scoring process 624 puts the output into a standard format that is easy for the insurer to use to prioritize policies for audit or investigation and puts that output into a results file 626.

The post-scoring process 624 may perform calculations that will assist the insurer in using the results. For example, in one embodiment of the system, the post-scoring process 624 performs two calculations on each model score to scale the model score into metrics useful to the insurer. First, it converts the model score output of predictive model 622 to a "fraud score" that can be interpreted as a probability of premium fraud in the policy and stores that result in results file 626. Second, it also calculates the expected net adjustment to the premium from performing an audit on each policy and stores that result in a results file 626.

In one embodiment, the model score from predictive model 622 is converted to a probability using the following formula:

$$P_F = \frac{\frac{F_s}{F_p} \cdot Ps}{\frac{F_s}{F_p} \cdot Ps + \frac{(1-F_s)}{(1-F_p)} \cdot (1-Ps)} \qquad (1)$$

Where
$P_F$=probability of fraud
$F_s$=fraud rate in the development sample
$F_p$=fraud rate in the population
$P_S$=predictive model score And, the probability is re-scaled to a final fraud score (in 0-1000 range) using the formula:

$$\text{fraud score}=1000*P_F \qquad (2)$$

where 1000 is a scaling factor.

In another embodiment, the model score from the predictive model 622 may be used without further elaboration.

The interpretation of the model score as probability is desirable when the expected net adjustments are also calculated. To use the score as a mathematical probability, it is divided by 1000 (or by whatever scaling factor is used). For example, a fraud score of 750 may be scaled as equivalent to a probability of 0.75. Given a policy, the expected net adjustment can be calculated as follows:

$$\text{Expected net adjustment} = P(\text{Fraud}) \cdot \Pi \cdot \alpha + P(\text{Non fraud}) \cdot \Pi \cdot \beta \approx \quad (3)$$
$$\frac{\text{Score}}{1000} \cdot \Pi \cdot \alpha + \left(1 - \frac{\text{Score}}{1000}\right) \cdot \Pi \cdot \beta$$

where:
- $\Pi$=Premium of the given policy;
- $P(\text{Fraud})=P_F$;
- $P(\text{Non fraud})=1-P_F$;
- $\alpha$=Average percentage of recovery from the fraudulent policies; and
- $\beta$=Average percentage of refund to the non-fraudulent policies.

The values of $\alpha$ and $\beta$ can be estimated from the insurer's historical audit data. Those values may depend on some other information about the policy, such as premium size. In that case, $\alpha$ and $\beta$ are not parameters, but rather are functions. For example, $\alpha=f(\Pi)$ or $\beta=g(\Pi)$.

Alternatively, a table may be constructed with premium bins (e.g., premiums binned by $1,000 increments) on one axis and probability-of-fraud bins (e.g., probabilities binned by 0.25 increments) on the other. The expected net adjustment figures are entered in the table using historical data, and then retrieved by the post scoring process 624 as needed.

The post-scoring process 624 updates the results file 626 which can subsequently update the results table 608b of the system database 404. A description of usage strategies for the model score and expected net adjustment is provided in Usage Strategies below.

11. Results Table

The results table 608b contains one record for each scoring candidate that was considered by the policy selection process 610. In one embodiment, this includes the policy number, the start and end dates of the scoring period, and any exclusion code generated by the policy selection process 610 or variable derivation process 614. Most importantly, it also includes any information that was added by the fraud detection engine 408. That information may include a model score, red-flag indicators, and reason codes. Finally, the table also stores any post-processing results, as described above under Post-Scoring Process, such as the fraud score and the expected net adjustment. The results table 608b is preferably stored in the system database 404 from which the users access it, or it may be passed directly to the users through an external interface.

The system 600 as described is preferably implemented within the confines of an insurer's computer system, and/or in combination with an insurer's computer system (and database) and a separate computer system managed by a provider of the present invention as a service to the insurer. This configuration detail is not material to the present invention.

D. Usage Strategies

Once a set of polices has been scored, a variety of usage strategies may be applied to determine which policies will be selected for investigation or audit, including either field audits or desk audits. A strategy may be defined with respect to the following considerations:

1. Re-scoring frequency The insurer can select any time interval for re-scoring the policies, such as yearly, quarterly, monthly, weekly, daily, or on demand. Alternatively, re-scoring can be done only when the data changes. For example, in workers' compensation a policy could be considered for re-scoring whenever a new payroll report is submitted by the policyholder. An automobile insurance policy could be considered for re-scoring whenever a claim is submitted or when the policy information changes (such as the addition of a new driver). The selection of re-scoring frequency is part of the usage strategy because it determines how often new scores become available so that audits may be assigned on the basis of those new scores. The choice of scoring frequency is often influenced by the level of staff available to conduct audits.

2. Prioritization of Policies for Auditing As an insurer is likely to have thousands, perhaps tens of thousands of policies, it is not possible to audit every policy, even annually. The model scores and red-flag indicators can be used to prioritize policies for auditing. Strategies for using the scores and red-flag indicators must be determined by each insurer depending on that insurer's goals.

2a. Prioritizing policies using the model scores: An audit selection strategy of ordering the policies by model score (with the highest-scoring policy at the top of the list) and auditing all policies that score above some threshold is consistent with the goal of catching the maximum number of frauds (given the number of audits being performed).

FIG. 8 illustrates the workflow for using a strategy used with polices ranked by model score. First, a threshold determination 800 evaluates whether the policy score is greater than a predetermined threshold. This threshold may be set based on averages of the model scores of known fraudulent policies, as illustrated in FIG. 8. If the score is below the threshold, then it is determined (802) whether any red-flag rules have been triggered. If no rules have been triggered, then the appropriate action 832 includes keeping the policy, rewriting it, adjusting it for other reasons, or canceling it for other reasons.

If the score is above the threshold or if any of the red-flag rules have been triggered, then the policy is reviewed by either an automated or manual processes. This includes applying an additional field audit threshold 806. If the score is above this threshold, then a field audit 810 is initiated. If the score is below the field audit threshold, then the calculated net adjustment is compared 808 with another threshold, and if greater, again a field audit 810 is initiated. A red-flag rule (if set) may also trigger 810 a field audit. Finally, if the reason codes associated with the score are determined 812 by the insurer's own criteria to be very suspicious, then again a field audit 810 is called for.

If none of the field audit tests have been triggered, then the policy is set for a desk audit 814.

Either the desk audit 814 or the field audit 810 may identify 816 additional suspicious information. If so, then the insurer determines 818 whether its Special Investigation Unit (SIU) or an undercover investigation is appropriate. If so, the policy is referred 820 to the SIU for handling. The SIU may take various actions 822 which typically include an investigation, a report, and prosecution for fraud if appropriate.

The results of the audit or investigation are reported and recorded 824 in the appropriate internal files and databases. In some cases the audit determines that a refund 826 is due, in which case it is paid 836. In other cases, additional premium is due 828, in which case it is billed and collected 834. Finally, other cases will result in the current premium being accurate 830, and thus no change is made. The normal policy review actions 832 are then effected.

Other possible strategies make use of calculations performed by the post-scoring process 624. One example of a post-scoring calculation is the expected net adjustment rank, which ranks policies by the amount of premium the insurer can expect to recover by auditing that policy, for example as calculated above. Ordering policies by the expected net adjustment rank and auditing all policies above some rank threshold (or dollar amount threshold) is consistent with the goal of maximizing the amount of premium recovered (given the number of audits being performed). The post-scoring process 624 can be customized to produce other ordering metrics and to sort the scored policies by any metric to assist users in applying custom usage strategies. Alternatively, the policies can be ranked by their fraud scores, without regard to their expected net adjustment or other metric.

2b. Prioritizing policies using the red-flag indicators Another consideration when prioritizing policies for auditing is how to use the red-flag indicators. Under one strategy, the policies flagged by the rule-based analysis 620 are listed separately from the policies that are scored by the predictive model 622, and the flagged policies are reviewed for audit consideration. If the inconsistencies identified by the rule-based process 620 indicate with certainty a misrepresentation of policy data, then the policies flagged by the process are given high priority for auditing. Under another strategy, the policies flagged by the rule-based analysis 620 are screened for data entry errors (which could be the source of the contradictory data) before audits are scheduled.

3. Re-auditing frequency Another consideration when determining a usage strategy is whether a scored policy has been previously audited. Not every policy that receives a high score is engaged in premium fraud or abuse; there may be a legitimate reason for even the most unusual or suspicious-looking behavior. Therefore, if a policy is audited and found to be reporting information honestly, the insurer may choose not to re-audit that policy for some period of time, even if it continues to receive a high score. An insurer may rely on the reason codes as part of the strategy. For example, the policy may not be re-audited if the reason codes point to a suspicious factor that was validated as legitimate during the previous audit. Each insurer can determine the amount of "time out" that should be allowed after an audit depending on the number of audits they wish to perform, their use of the reason codes, and the characteristics of their policyholders.

4. Actions and Thresholds The insurer preferably defines one or more thresholds for the model scores (or fraud scores) for initiating selected actions on a policy. A single threshold may be used to simply categorize policies for either further investigation or no action. Multiple thresholds allow for more selective actions. For example, an insurer could define multiple actions and accompanying thresholds such as:

| Fraud Score Threshold | Action |
|---|---|
| >700 | Field Audit |
| 550 | Desk Audit |
| 500 | Watch List-Assign Auditor |
| <500 | No Action |

These particular fraud scores and actions are merely exemplary as it is anticipated that the individual insurer will establish them as needed.

5. Use of Reason Codes and Explanations The reasons returned along with the model scores can improve audit efficiency by focusing attention on the aspects of the policy that are most suspicious. The reasons may be used as part of a usage strategy to enable insurers to increase the efficiency of audits. One such strategy may involve defining different audit actions for different reason codes. For example, in workers' compensation insurance, reason codes indicating a problem with the distribution of payroll may be deemed to warrant field audits, whereas reason codes associated with company type may warrant a desk audit. Another strategy might stipulate that high-scoring policies with certain reason codes are assigned to auditors with particular areas of expertise.

E. Development of the Predictive Model

1. The Model Development Environment

The model development environment is more demanding than the environment in which the model will function once it is completed and deployed. Model development requires more information than is required for the deployed system to operate. When a deployed model scores policies for the likelihood of fraud, the model does not need to know whether each policy turns out to be fraudulent or not. However, in order to develop a model that can identify fraudulent patterns, it is necessary to know which policies are fraudulent and which are not. The process of determining whether a policy is fraudulent or not is called "tagging" and is discussed in detail below under "Tagging Procedure." It is important to realize that the tagging process is not part of the deployed system; it is only necessary for developing the system. Therefore, only the policies that are used for model development need to be tagged.

Another property particular to the model development process is the complete use of historical data. When the deployed model scores a policy, it may use all of the information that exists on that policy (up to the very day that the scoring occurs). Model development is done using a random sample of historical policies. In selecting that random sample, both the policy and the scoring date are randomly selected (details are discussed below under Sampling Procedure). Because the scoring date is in the past, it is necessary to limit the information that the model uses to only that information that was available on the scoring date.

Finally, a deployed model includes variables that describe the policy and provide the information the model needs to identify patterns of fraud. When developing the model, it is not yet determined which variables will be most valuable in identifying fraud. That determination is made during the model development as part of the variable design, variable selection, and model training processes. All three of those processes are discussed below.

FIG. 9 illustrates the overall process flow for developing the predictive model 622.

2. Data Preprocessing

The raw data used for model development may be received in any format from the insurer(s). Accordingly, the first step for model development is data pre-processing 901, in which the raw data is converted into a format acceptable for input in the database 404. An exemplary format for the system database's tables for a workers compensation embodiment is described in Appendix A.

3. Sampling Procedure

Sampling 903 is needed in order to train the predictive model 622 with a sample data set representative of the mix of scoring entities that will be seen when the system is deployed. A random sample of observations is constructed for model development, where each observation has its own scoring period. Scoring periods that would be excluded from scoring by the selection criteria after the system is deployed are also excluded from sampling.

In an embodiment directed to workers' compensation premium fraud and abuse, pairs of policies and scoring dates are randomly chosen. Criteria are then applied to determine if a valid scoring period can be established. In one embodiment, a valid scoring period is the most recent 12-month period prior to the score date, for which there is actual (not estimated) reported payroll and which meets the insurer's selection criteria, such as described under Policy Selection Process or their equivalents. If a valid scoring period cannot be defined, the observation is excluded from the dataset. Referring to FIG. 9, the result of the sampling procedure is the dataset containing sample points (exemplars) 904.

In addition, it is necessary to have good representation from both fraud and non-fraud observations in the modeling development sample. Since fraud is a relatively rare event, it is typical to "sample-up" the fraud observations and "sample-down" the non-fraud observations to insure that the model has enough examples of fraud to learn from.

4. Tagging Procedure

In order to train the model to recognize patterns associated with fraud, it is necessary to use examples of fraudulent and non-fraudulent policies that are clearly labeled as such. Tagging 905 is the process by which each sampled scoring period is labeled as either fraudulent or non-fraudulent. In general terms, a scoring period is labeled as fraudulent if the policyholder reported incorrect information that resulted in a significant underpayment of the premium and there was potential for recovery at the time of scoring. The insurer decides the appropriate threshold for significant underpayment for tagging a policy as fraudulent.

In an embodiment directed to workers' compensation premium fraud and abuse, a policy is labeled as "fraudulent" during a scoring period if the information on the payroll report resulted in a significant underpayment of premium and is labeled as "non-fraudulent" if the information resulted in sufficient premium being paid. Tagging is done by comparing the reported premium (from the payroll report) with the premium as determined by audit(s). Therefore, a policy can reliably be tagged in a given scoring period only if a sufficient portion of the scoring period has been audited. It is preferred that a substantial majority (e.g., 80-90%) of the reported payroll for a scoring period has been audited. Observations with insufficient audited payroll are labeled as "indeterminate." They are not used in training the model and are excluded from the sample.

For observations with sufficient audited payroll, the tag is determined by comparing the reported premium with the audited premium. If, based on the audit, the employer paid sufficient premium, then that policy is tagged as non-fraudulent for that scoring period. A policy is tagged as fraudulent for a scoring period if the employer underreported the premium by more than a selected percentage (e.g., 6-12%) and the score date is before the date of the audit (i.e., at the time of scoring, there is still an opportunity to collect significant additional premium). Using such a strict criterion ensures that the model is trained to recognize truly fraudulent patterns. The tagged observations dataset 906a is that subset of the randomly selected scoring entities (policy and scoring period) which can be tagged as either fraudulent or non-fraudulent.

5. Variable Design

The output of the predictive model 622 depends on variables that characterize the policy and related activity and that can distinguish between fraudulent and non-fraudulent behavior. The predictive model 622 scores a policy based on a comprehensive characterization, as encapsulated in a variety of variables derived from the data in the system database 404.

The variables used by one embodiment of the predictive model 622 fall into the categories summarized in Table 2:

TABLE 2

Types of Variables for Predictive Model

| | | Direct | Peer Group | Over Time |
|---|---|---|---|---|
| Policy | | Measures of characteristics of the policy, policyholder, | Characteristics of a policy that are derived using | Comparisons of the activity or characterization of |

TABLE 2-continued

Types of Variables for Predictive Model

| | | Direct | Peer Group | Over Time |
|---|---|---|---|---|
| | | payroll, and non-claim activity related to the policy. | statistics from historical data based on a peer group defined for that policy. A given policy can have different peer groups depending on the method used to define a peer. | the policy across time. The comparison may involve a single property of the policy or a vector of properties that characterize the policy or its activity. |
| Claim | | Measures of characteristics of the claim activity on the policy, possibly in comparison with other characteristics of the policy. | Characteristics of claim-related activity that are derived using statistics from historical data based on a peer group defined for given claim or policy. A claim or policy can have different peer groups depending on the method used to define a peer. | Comparisons of some aspect of the claim activity on the policy across time. The comparison may involve a single aspect of the claim activity or a vector that characterizes many aspects of the claim activity. | a) Policy vs. Claim Variables

A distinction is made between policy variables and claim variables as these represent characteristics derived using two fundamentally different streams of data. Policy variables are solely based on features of the policy and associated policyholder(s) that are relevant to assessing the risks associated with that policy. Claim variables, on the other hand, are derived from information about any claims that were filed on a given policy and thus represent the losses that were incurred from that policy. Claim variables may compare information about claims filed on a policy with other information on that policy. Such variables are valuable because they can check for any inconsistencies between the policy data (particularly data submitted by the policyholder) and claim data (which the insurer knows to be correct since it is obtained from the insurance company data bases).

In a workers' compensation embodiment, claim variables are a particularly interesting class of variables because they characterize activity that is not initiated or controlled by the policyholder. Claims are filed on behalf of an employee of the policyholder if and when an employee suffers a work-related injury or sickness. This contrasts with other activity related to a policy such as submitting payroll reports, paying premiums, requesting certificates, and cooperating with auditors, all of which are direct actions of the policyholder.

b) Direct Variables

Direct variables are those variables that, for a given entity, depend only on the data associated with that particular entity and are independent of the data values for other entities. Such variables generally include either unmodified data taken from input tables 608a or variables that can be derived or computed from the data in input tables 608a. One example of a derived direct variable is a scalar representation of vectors of data from input tables 608a. Scalar representations may include entropy measures (such as a dot product or distance measure) or distribution measures (such as a maximum or a count of the non-zero elements in the vector).

In an embodiment of the system 600 for worker's compensation insurance, the direct policy variables include variables describing the policy itself (e.g., type of company, locations, number of employees, number of cancellations in the recent past, age of the policy), and variables measuring some aspect of the amount or distribution of payroll as the employer has reported it, such as the share of payroll in a given class code (e.g., payroll share in clerical class code, or maximum payroll share in an industry group).

Direct claim variables are those that measure claim activity on the given policy. Direct claim variables then may compare the number or type of claims with some other characteristic of the policy, such as the size of the payroll, age of the policy, and the like, or may simply be raw measures of claim activity, such as total number of claims, dollar amounts of claims, claim frequency, and the like.

c) Peer Group Variables

Peer group variables are used to characterize a policy based on the statistics learned from historical data. In contrast to direct variables, peer group variables for a given policy depend not only on the features of that particular policy but also on the historical statistics of other policies in the population. During model development, appropriate statistics for various peer groups based on historical data are computed and stored in association with peer groups in the lookup tables 616. During operation, peer group variables for a given policy are derived by determining the appropriate peer groups into which the policy is categorized, and then retrieving the associated statistics for those peer groups from the lookup tables 616. The following paragraphs describe the process of creating the lookup tables 616 during model development.

Intrinsic to the definition of a peer group variable is the definition of a "peer" for a given policy. One trivial peer group for any policy is the entire set of insurance policies issued by the insurer. However, more specific and useful definitions of peer groups can range from a particular characteristic of the policy (e.g., whether a policy is a sole proprietorship or a corporation) to a specific clustering of policies into different groups based on one or more characteristics or features of the policy (e.g., policies grouped by SIC code, or grouped by SIC code and company size). Standard (predetermined) groupings can be used. Additionally, policies can be clustered by a data-driven process in which groupings are derived using co-occurrences in vector characterizations of the policies with respect to many different variables simultaneously. Using different grouping schemes enables a multi-dimensional and more comprehensive characterization of the policy being analyzed. The specific combination of grouping schemes to be used is determined during model development, and is influenced by the type of insurance being analyzed, the population of policyholders, and the insurer's preferences.

In an embodiment of the system 600 for workers' compensation insurance, different types of groupings for policies and industry class codes are used. Examples of pre-determined policy groupings include Standard Industry Code (SIC) groups and NCCI industry groups. In addition, data-driven groupings are used to group class codes that are likely to appear together on the same policy. Similarly data-driven policy groupings can be obtained by clustering policies based on the vectors quantifying each policy's payroll share in standard industry groups.

Once the various grouping schemes are determined, the desired statistics for each individual group are computed from the policies associated with the particular policyholders in each group. When computing the statistics for any grouping scheme, it is important to ensure that the estimates are robust with respect to any small samples that may occur in certain groups or clusters. While the simplest way of achieving this is to adjust each estimate using the corresponding global statistic for the population, in some cases more sophisticated methods can be applied, as described below. These robustized estimates are the values that are saved in the various lookup tables 616, and are indexed by the associated grouping. In production then, the global variables for the policy being scored are computed by using the characteristics of the policy to access the appropriate values in the lookup tables 616.

Peer group variables can have a variety of forms depending on the policy being analyzed, the type of peer group and the characterization measure used. Examples of two forms of global variables that are particularly useful for detecting premium fraud and abuse are described below.

1. Variables estimating the probability of a dichotomous outcome (e.g., fraud or non-fraud) or a certain distributional statistic (e.g., average) of a continuous quantity, based on the peer group for the policy.
2. Variables quantifying the comparison between the characteristics of a policy and those of its peer group.

One example of the first type of peer group variable, where a probability of a dichotomous outcome is estimated, is referred to as a peer group risk variable. For premium fraud, peer group risk variables generally estimate the probability that a policy is fraudulent, based on statistics of historical data for that policy's peer group. Although all of the subsequent discussion on risk variables uses the probability of fraud as the measure being estimated, the same techniques can be applied to estimating the probability of another dichotomous outcome or even a statistic of a continuous quantity, such as average size of payroll.

Note that different risk variables can be computed for the same policy based on different definitions of peer groups. Thus, if a policy P belongs to peer group G1 in one grouping scheme S1 (e.g., SIC classification) and to a peer group H1 in another grouping scheme S2 (e.g., legal structure), the risk variables for P corresponding to the different grouping schemes S1 and S2 are defined as:

Risk Variable $1 = P(\text{fraudulent} | \text{peer group } S1 = G1)$;
and

Risk Variable $2 = P(\text{fraudulent} | \text{peer group } S2 = H1)$ (4)

For example, as noted, one type of peer group risk variable in a workers' compensation embodiment of the system is based on the legal organization of the policyholder company (which is the grouping scheme S1 in this example). The peer group risk variable for any given policy is then computed by determining the legal organization that the policy is associated with (e.g., sole proprietorship, corporation, or the like) and extracting the estimated probability from the associated lookup table which lists a risk factor for each type of legal organization. Likewise, the peer group risk for the policy's industry classification (S2 in the above example) would be retrieved from a lookup table which lists a risk factor for each SIC classification.

More sophisticated versions of risk variables can be created by combining different types of peer group risk variables through different functions. Thus, Variable=$f(P(\text{fraudulent}|\text{characteristic}_1), P(\text{fraudulent}|\text{characteristic}_2), P(\text{fraudulent}|\text{characteristic}_N))$ (5)

A variable of this type in the workers' compensation embodiment of the system is based on groupings of job class codes. An employer will have employees in a number of different job classes, each of which has a different level of risk of being misrepresented. The risk values corresponding to each job class code on a policy can be used together to compute a maximum group job class code risk value for that policy. Thus, Max Group Class Code Risk=$\text{Max}\{P(\text{fraudulent}|\text{group}_i)\}$ (6)

where i ranges across all the groups represented by the job class codes listed on the policy.

As described above, the values for fraud risk in (6) are taken from the lookup tables 616 (created during model development) using the class code group as an index into the table. To assess the risk value corresponding to each class code on the policy, first each job class code is mapped to a job class code group. Then the risk value for that class code group is extracted from the corresponding lookup table 616. The following tables illustrate the formats for the class code group mapping table and the lookup risk table for class code groups.

| Mapping of Class Codes to Class Code Groups | |
|---|---|
| Class Code | Class Code Group |
| 1231 | 03 |
| 1342 | 07 |
| ... | ... |
| 9738 | 01 |
| 9999 | 05 |

| Lookup Table for Class Code Group Risk | |
|---|---|
| Class Code Group | Risk Value |
| Missing | 0.0753 |
| 01 | 0.0984 |
| 02 | 0.0232 |
| ... | ... |
| 09 | 0.1011 |
| 10 | 0.0724 |

The risk values obtained for each of the class code groups on a policy are then used in (6) to obtain a Max Class Code Group Risk value for the policy. Note that the risk values here are merely exemplary.

When the multiple characteristics shown in (5) represent a hierarchy in the population, the function $f$ can be defined to obtain a "hierarchical" risk variable. This variable will have a value that is made robust with respect to small samples in (certain) peer groups in a more sophisticated fashion than the simple risk variable defined in (4). The hierarchical value is computed in a recursive fashion, starting with the characteristic that represents the broadest peer group (highest level of the hierarchy) and successively adjusting the estimate with data from the smaller peer groups (lower levels of the hierarchy). This is possible where the characteristics are encoded in a discretely identifiable manner in the data.

An example of such a hierarchical structure is the SIC code, which is represented by 4 digits. The first digit represents the broadest or highest level of category of industries, the first and second digit together represent a subset of this category (i.e., an intermediate level of categories), and so on, until all 4 digits represent the finest (or lowest) level of classification. Thus, instead of using the risk estimate corresponding to the entire SIC code alone, a hierarchical value that combines the statistics corresponding to these nested subsets provides a more robust estimate of the variable being computed. As mentioned above, this technique can be applied not only to a categorical outcome (classification problem), but also to a continuous characteristic.

The following describes the method of computing the hierarchical risk value corresponding to an example SIC code, 1521. This code represents the following hierarchy of categories:

1—: mining and construction
15—: general building contractors
152—: residential building construction
1521: single family housing construction Here, the leftmost "1" is a first variable component, and the rightmost "1" is the last variable component.

Initially, raw risk values are computed for each level of the hierarchy from historical policy data, and stored in the appropriate lookup tables. Thus, in the case of this SIC code, lookup tables are constructed for 1-digit, 2-digit, 3-digit and 4-digit SIC code values.

For example, consider computing the hierarchical risk for a SIC code value of 1521. First the raw risk value for the 1-digit SIC code "1" is extracted for all policies belonging to the industry group (mining and construction) associated with the SIC value of "1" for the first (most significant) digit and adjusted (e.g., using a Bayesian update) for small samples based on the population value. This risk value is stored in a lookup table.

Then the raw risk value for the 2-digit SIC code "15" is accessed for the (smaller) set of policies belonging to those companies which are general building contractors, and this is then adjusted for small samples using the adjusted value for the 1-digit SIC code. This value is then also stored in the lookup table.

The next step accesses the raw risk value for the 3-digit sic code "152" and then adjusts this based upon the adjusted 2-digit value. This too is stored in the lookup table.

In the last step, the raw risk value for the 4-digit SIC code is adjusted using the adjusted 3-digit value. Thus, the hierarchical SIC code risk statistic represents a risk estimate that has the risk values of the four hierarchical levels appropriately blended together. The same process can be followed for computing a hierarchical average value for a continuous quantity such as payroll size.

The variables described above focus on obtaining a characterization or estimate of a certain quantity for a policy based on the peer group that it belongs to (i.e., the estimate for the associated peer group becomes the estimate for that policy). A second type of global variable quantifies how a policy compares to other policies within its peer group, by calculating any of several standard statistical measures, such as a Z-value. In order to compute these global variables, some group-wide statistics, such as the mean and standard deviation for each group, are stored in lookup tables 616 during model development.

An example of this type of peer group risk variable in the workers compensation embodiment of the system is:

$$\text{Clerical share } z\text{-variable} = \frac{(\text{Policy's Clerical share}) - (\text{Mean clerical share in its peer group})}{(\text{Standard deviation of clerical share in its peer group})} \quad (7)$$

The mean clerical payroll share for each peer group as well as the standard deviation within the group is stored in a lookup table 616. For each policy, its clerical payroll share (determined from the Payroll/Adjustment Line Table 708) is compared with the average for its peer group by calculating the Z-statistic as shown in (7).

While the examples above relate to peer group policy variables, the same techniques are used to derive peer group claim variables. Peer group variables based on claim activity are used to compare claim related information of the policy with that of the policyholders' peers. Examples include risk based on the number of claims and variables based on claim costs for claims occurring under a certain class code, SIC code or other grouping.

d) Over-Time Variables

Over-time variables are used to characterize a temporal change in the activity of the policy being analyzed. Both direct and global versions of such variables may be derived. Over-time variables may compare scalar or vector characterizations.

Over-time variables that compare a scalar characteristic between a policy and its peer group are typically constructed as a ratio or percentage change. An example of such a variable in the workers' compensation embodiment of the system is the change in payroll share in the NCCI Exception group between two different time periods.

Over-time variables that compare a vector of information can be computed by using a distance metric, such as a dot product or L1-norm or L2-norm. For example, in the workers' compensation embodiment, the vectors of payroll shares in all NCCI industry groups in different time periods are compared by computing the dot product between the two vectors (normalized by the L2 norm of each individual vector).

For example, a vector P of payroll shares in a past time period t in a policy may be defined as:

$$P_t = \{S_2, S_3, \ldots, S_n\}$$

where S is a percent share in the payroll, and n ranges over a number of SIC class codes. This vector can then be compared with a similar vector $P_{score\_period}$ of payroll shares during the scoring period to obtain a measure D of the overall change (distance) in the payroll distribution, for example by dot product:

$$D = P_t \cdot P_{score\_period}$$

The variable D is then used as an input to the predictive model 622.

Similarly, current claim activity can be compared with past claim activity on the policy. For example, the number of claims can be compared with the previous number of claims or vectors of the number of each type of injury for which a claim was filed can be compared over time. Again, distance measures may be computed to compare changes in these vectors over time.

6. Variable Selection

The foregoing discussion on variable design highlights the types of variables that are used in one embodiment. There remains the issue of selection of particular variables in a given deployment of the system 600. The primary objective is to select the set of variables that best discriminates between the fraudulent and non-fraudulent policies. Additional considerations for variable selection include availability of variables at scoring time, efficiency with which variables can be derived, robustness, and regulatory constraints. There may be several hundred potential model input variables, summarizing information about each policy (and, in one embodiment, its associated claims), from which to select. Those of skill in the art are familiar with the techniques used to select variables from a population for modeling that population.

Generally variable selection is an iterative process, involving statistical techniques, to select a subset from the group of potential variables considered for inclusion in the final predictive model 622. The process of variable reduction develops more robust and parsimonious models that minimize overfitting and optimize performance. In one embodiment where the predictive model 622 is provided by a neural network, variable selection is performed using conventional techniques including sensitivity analysis and variable selection based on variable grouping.

Sensitivity analysis is applied to neural network models in order to measure the contribution of each independent predictor variable to the value of the target variable. The sensitivity value can be interpreted as a measure of the variable's importance (in determining the model's output) across all observations. Variable selection is performed using a combination of various techniques. One technique involves organizing predictor variables into groups of related variables called factors. Variables within each group represent essentially the same information. Selecting only the strongest representatives in each group eliminates considerable redundancy. This process may be performed using the Automatic Variable Selection process in Database Mining® Marksman from HNC Software, Inc. of San Diego, Calif. Other techniques include stepwise linear regression and choosing variables with a high degree of correlation with the target.

As noted above, the predictive model 622 may be developed on the policy data of an individual insurer. Alternatively, a consortium model may be developed that pools data from multiple insurers and is designed to be delivered to different insurance carriers. In such a case, variables should be selected that have similar characteristics, including correlation to fraud, across multiple insurers in order to ensure good performance for any individual insurer. The variable selection process is closely intertwined with model training, which is described in Model Training.

7. Variable Derivation

The model development environment is generally designed to mimic the production environment as closely as possible. For each observation in the sampled data, input variables are derived 907 just as the variable derivation process 614 would do in production. However, since a large part of variable selection occurs as part of training the model, at the beginning of the training process, it is not yet known which variables will be selected. Accordingly, all of the potential variables are derived 907 for each observation in the sample dataset 904. The result is dataset 906b, which includes each of the sampled observations along with the derived values of all of the potential variables for each observation. This dataset is combined with the tagged observations dataset 906a to form the model development dataset.

8. Test/Train Split

A randomly selected portion (e.g., 20-30%) of the model development dataset is held out 909 from model training. This hold-out set is referred to as the "test" data 908b and is used to test the model that is trained on the remaining dataset 908a portion of the dataset 906a. Evaluation of the hold-out data ensures that the predictive model 622 does not over-fit the training data 908a. Also, the test data can be used to estimate the production performance of the model (indeed, of the entire system).

In addition, during this phase, selected observations are excluded from the training data 908a. The preferred exclusions include:

Excluding observations that are labeled as indeterminate;

Excluding observations that will not be scored in production, for example, policies with no payroll during the scoring period; and Excluding observations for which some model inputs cannot be derived because of data problems.

9. Segmentation

In developing a system to score all members of a population (e.g., all policies of a particular insurer), it is sometimes beneficial to create different models for different segments of the population. Such segmentation may be beneficial if:

1. Different data elements are available for different segments.
2. The relationship between the input variables and the target output is fundamentally different in different population segments.

As noted above, one embodiment of the predictive model 622 is provided by a neural network. One of the powers of neural networks is their ability to model complex interactions and non-linear relationships in the data. Thus, neural network models require far less segmentation than would be required from traditional modeling techniques. Minimizing segmentation provides many benefits, including: more observations used in training each model; developers can focus on optimizing fewer models; less effort is required to calibrate scores across models; and users of the system do not need to become familiar with individual nuances of as many models. In one embodiment for workers' compensation insurance, a single model is used because the policy data is sufficiently uniform with respect to different populations. Alternatively, different predictive models 622 may be used for different populations as dictated by the type of insurance and the data.

10. Model Training

Once the model development dataset is created through the procedures described above (sampling, tagging, deriving variables and splitting the modeling dataset into testing and training datasets), the predictive model 622 can be trained 910 using the observations in the training dataset 908*a*. The role of the model is to synthesize the variables describing the policy being scored into an estimate of the target (tag).

Given the training data sample 908*a*, the predictive model 622 is subjected to a learning process by which it discovers how to associate different combination of variables with the target that it is being trained for (in this case premium fraud and abuse). This process involves repeatedly showing known examples of tagged policies to the model. In one embodiment of the predictive model for premium fraud, the inputs are the variables that characterize the policy, and the output of the model is the non-fraudulent/fraudulent tag (or their coded representations, 0 and 1, respectively). For each observation in the training data, this tag indicates whether there is potential for recovery on the given scoring period (policy and time period).

As noted above, in one embodiment, the target on which the predictive model is trained is the fraudulent/non-fraudulent tag, which thereby results in a model score as to the relative likelihood of fraud. In an alternate embodiment, the predictive model is trained on a target which is the premium adjustment found in the audited policies; in this embodiment, the model directly outputs an expected premium adjustment value, which may be used in the various usage strategies discussed above.

When training is initiated, the model parameters are essentially random, but as each tagged policy is presented to an intermediate predictive model, the parameters of the model get tuned and the discrimination power of the model improves. Evaluation and adjustment 911 of the model is based upon the error of prediction, which is the difference between what the model produced as an output and the known correct output target (the tag). Typically, the entire set of tagged policies is shown to the model several thousand times during training. The tagged policies that were isolated for testing (not used to train the model) are used to halt the training process at the appropriate time, namely when the predictive model is beginning to over-fit the training data set. The result is the final predictive model 622.

The trained predictive model 622 produces an output estimating the true tag. In one embodiment, this output is a continuous score. That score is then adjusted so that it can be interpreted as the likelihood that the observation is fraudulent, that is the fraud risk. It may also be scaled to a convenient range, such as 0-1,000, as described above.

The primary purpose of the system once deployed will be to score policies before they are audited (to identify which policies should be audited); however, the model may also be used to assess scoring periods of policies previously audited. Hence, it is desirable for some observations in the modeling data to correspond to policies where the scoring period has been previously audited at the time of scoring and others where it has not. Observations that have been audited previously have a much lower fraud risk at the time of scoring (i.e., a lower opportunity for recovering further premium since their premium was already adjusted if it was insufficient). Accordingly, a variable "previously-audited" is employed to control for whether the scoring period for the policy had been previously audited at the time of scoring. This variable takes a value of "0" if the period has not been audited and a value of "1" if the period has been audited.

Where the predictive model 622 is a neural network, if a standard training process were used, the predictive model 622 would have the tendency to learn to simply treat previously-audited as a main driver of fraud risk. However, an important objective is for the model to have optimal performance on the policies that were not previously audited (previously audited=0), based on the other variables that characterize the policy. In other words, previously-audited should act to modify or calibrate the score, not as a main driver of the score. This can be achieved by training the predictive model 622 with the following 2-stage training process:

Stage 1. Train model on observations in which previously-audited is randomly set. (The idea is that the predictive model 622 learns how the other variables drive fraud risk, and previously-audited does not have any impact on the model score.)

Stage 2. Using the same set of modeling observations, properly set previously-audited to 1 or 0 as appropriate for the observation, and continue training, using the weights from the Stage 1 process as the starting point. (The idea is that the basic structure/weights of the model have been set, but previously-audited is now allowed to have its calibration effect.)

F. Alternative Embodiments

As established by the foregoing, the present invention provides an accurate and detailed analysis of policies with respect to insurance fraud and abuse resulting from misrepresentation of policy-related information. While one embodiment is specifically targeted toward premium fraud and abuse generally, and workers' compensation particularly, the principles of the present invention may be applied more generally than that, as illustrated by the following various embodiments.

Figure 1:
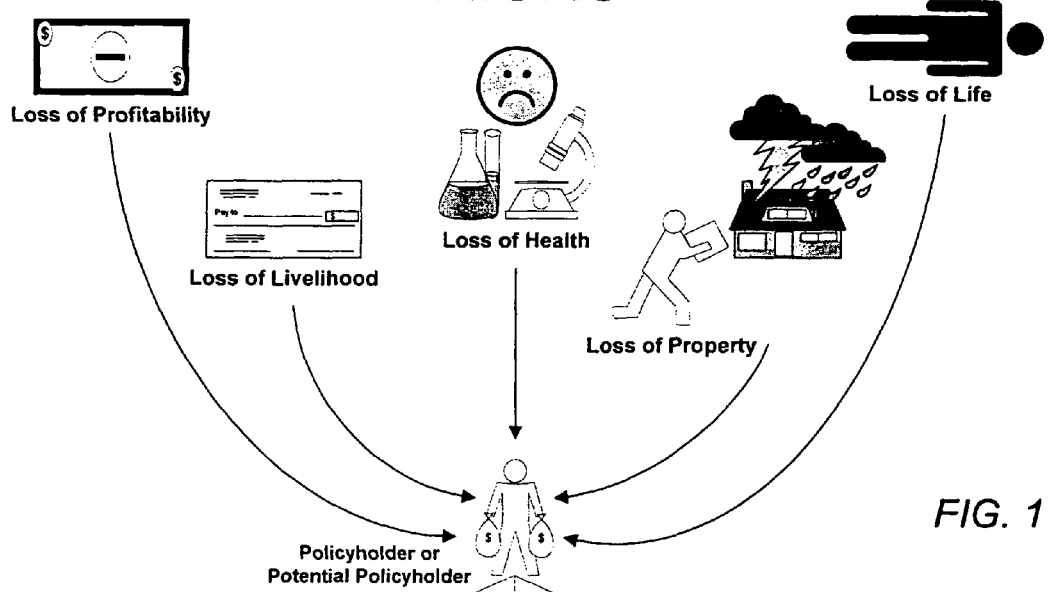
FIG. 1 is an illustration of the nature of an insurance relationship in the context of the present invention.
Figure 1:
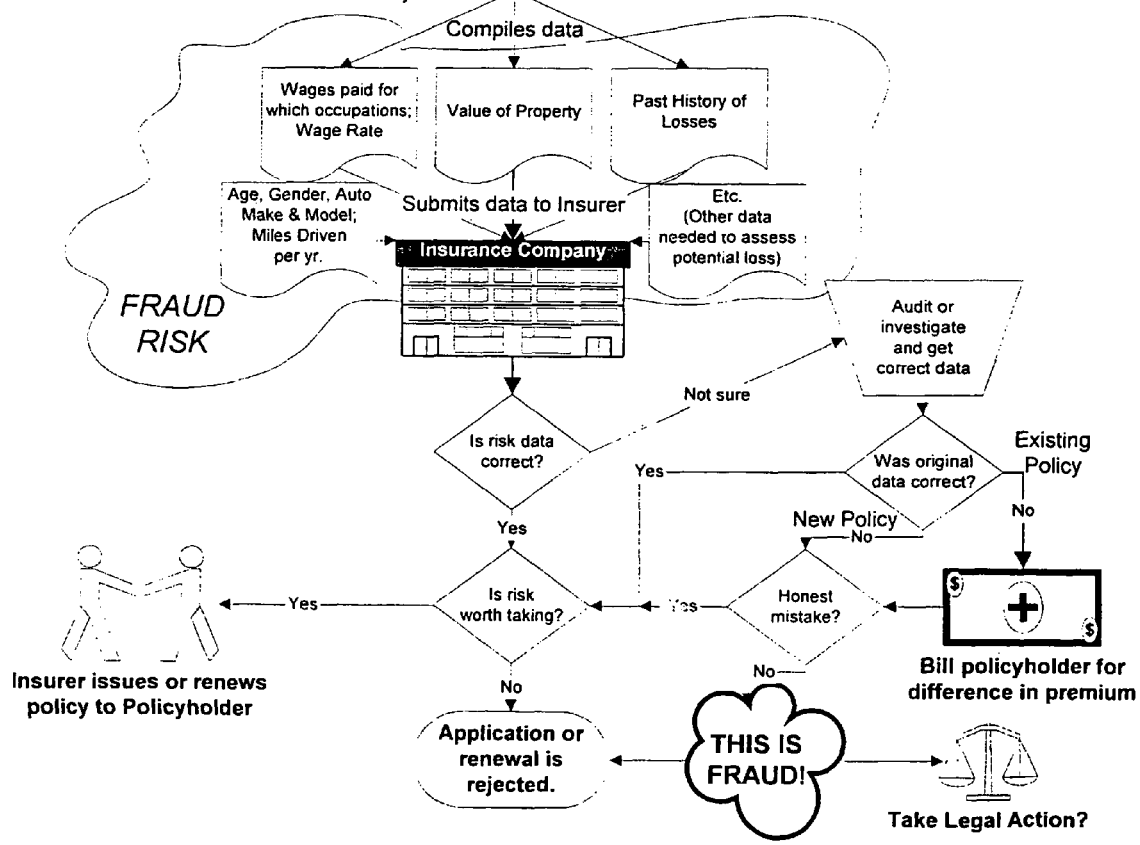
Figure 2:
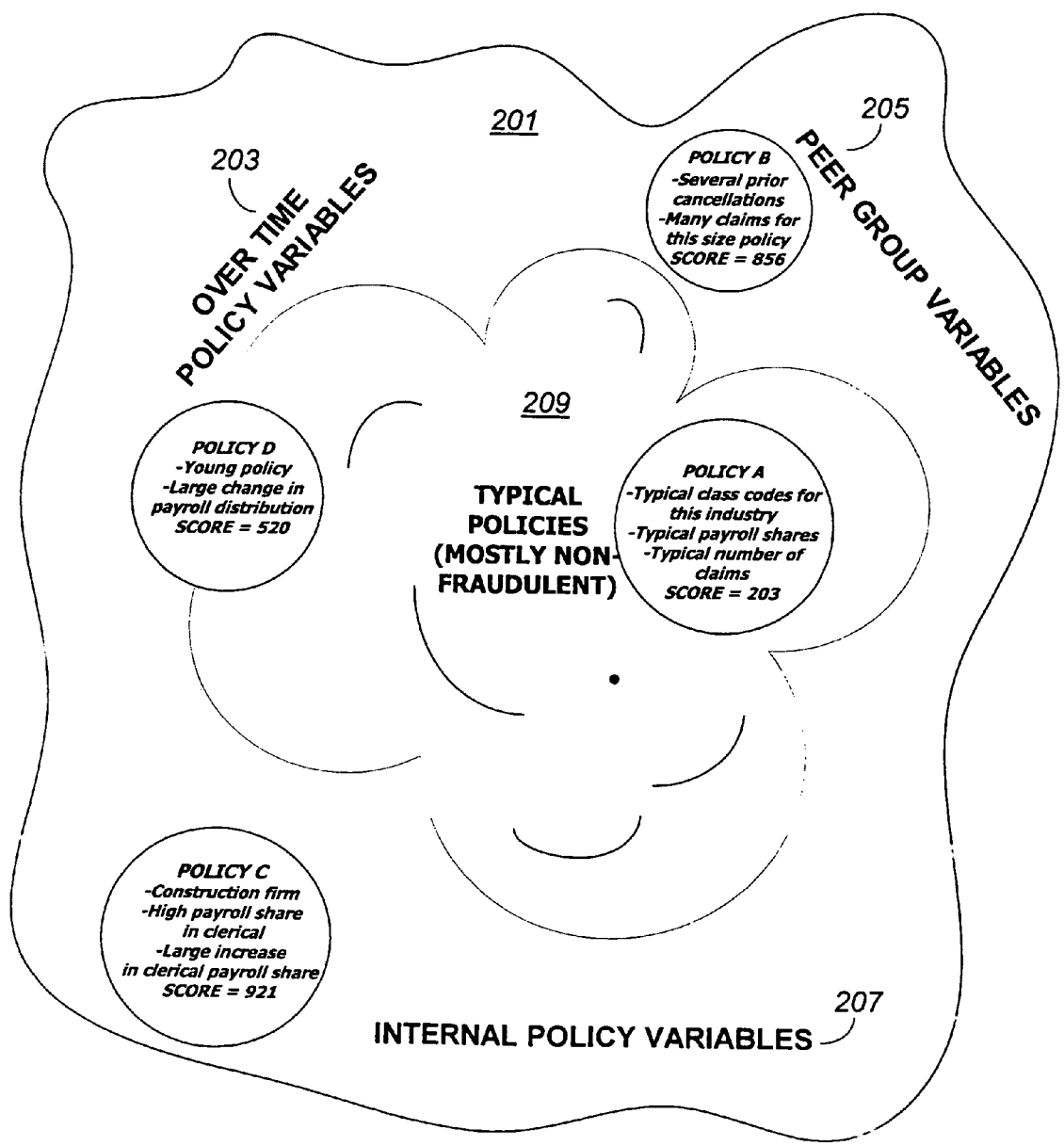
FIG. 2 is an illustration of the conceptual model of fraud detection by the present invention.
Figure 3:
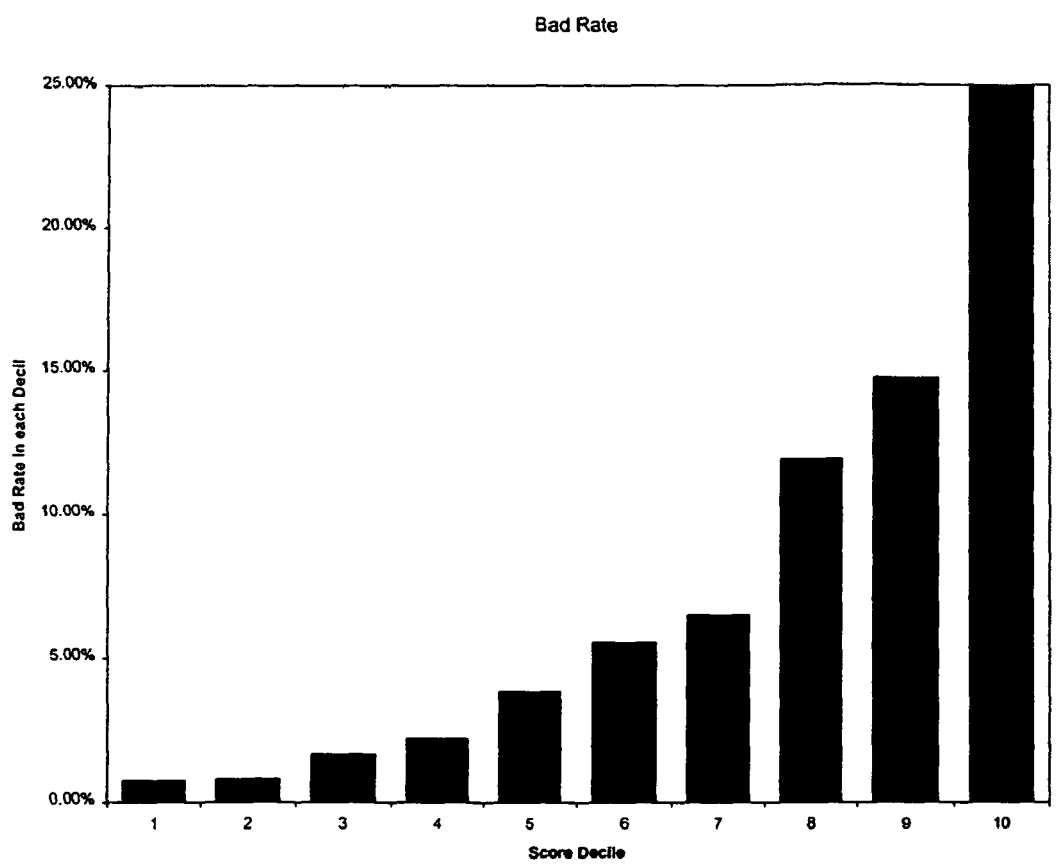
FIG. 3 is an illustration of the model score distribution showing how the score identifies premium fraud and abuse suspects.

First, the types of insurance that may be beneficially analyzed by the present invention extend well beyond workers' compensation insurance, including, for example, the types of insurance described with respect to FIG. 1 (e.g., homeowners' insurance, health insurance, life insurance, disability insurance, etc.). Generally, the invention may be applied to any type of insurance where the amount of the premium is based on information about the policyholder and/or those persons or objects under the control of the policyholder or where the premium is determined from information obtained (directly or indirectly) from the policyholder.

Second, various different types of predictive models may be used in addition to the disclosed neural network model. One example would be an unsupervised model. This type of model would be used when historical data does not provide sufficient examples of fraudulent and non-fraudulent policies to train a supervised model. A clustering model is another example—such a model may be used to assist insurers in targeting anti-fraud programs to those policyholders with the highest likelihood of committing fraud.

Finally, other embodiments of the invention may involve varying the time perspective from retrospective to prospective. A retrospective embodiment analyzes the likelihood of policy misinformation during a past time period relevant to the policy. The model score is then useful for recovering premium that was owed for that past time period. An example is a workers' compensation embodiment to assist auditors who audit past time periods. A prospective embodiment analyzes policies to predict the likelihood of misrepresentation of policy information that is provided to determine the premium for future insurance coverage. A prospective model could be used, for example, to assist in determining whether to underwrite or renew a policy.

In summary, the present invention provides an effective and robust means for modeling the risks of insurance premium fraud and abuse, using a predictive model, and then operationally identifying potentially fraudulent policies by applying policy data and derived variables to the predictive model. The present invention encompasses the systems, methods, software products which model and deploy the features of the fraud detection system including the predictive model and rule-based analysis, and the various usage strategies for using the results of the scoring and analysis on the a set of policies.

While the present invention has been described in detail with respect to particular embodiments of insurance and examples of certain types of variables, the scope of the invention is limited only by the claims set forth below.

Appendix A. Specifications of System Data Tables

An embodiment of the present invention uses ten data feeds to derive variables that are fed into the predictive model 622 and/or rule-based analysis 620. Each of these data feeds becomes a table in the reference tables 608a. These tables are illustrated in FIG. 7.

a) Policy File
b) Policy Status History File
c) Audit File
d) Payroll/Adjustment Header File
e) Payroll/Adjustment Line File
f) Estimated Payroll Report File
g) Officer File
h) E-Mod/Safety Record File
i) Claim File
j) Certificate File This section describes each of these data feeds and lists the field layouts for each of the files. The format for results returned by predictive model is also listed.

For the Format column:
C=character;
N=numeric;
CMD=century, month, day (CCYYMMDD; e.g., Jul. 4, 1776 would be 17760704)

It is again noted that the table formats shown below are merely illustrative and not a limiting feature of the present invention; it is expected that in practice the particular formats, layouts, and contents of tables used in an embodiment of the invention will vary according to the needs of a particular insurer and the format of such insurer's data.

1. Input Data Feeds a) Policy File

| FIELD # | FIELD NAME | FORMAT | SIZE | START | FINISH | DESCRIPTION |
|---|---|---|---|---|---|---|
| 1 | Record_Type | C | 1 | 1 | 1 | Always "D" = Data |
| 2 | Policy Number | C | 7 | 2 | 8 | |
| 3 | Reinstate/Renewal Number | N | 3 | 9 | 11 | |
| 4 | Transaction Date | CMD | 8 | 12 | 19 | The date on which the policy was last modified (CCYYMMDD) |
| 5 | Policy Effective Date | CMD | 8 | 20 | 27 | CCYYMMDD |
| 6 | Policy Cancel Date | CMD | 8 | 28 | 35 | CCYYMMDD |
| 7 | Policy Cancel Reason | C | 3 | 36 | 38 | |
| 8 | Policy Expire Date | CMD | 8 | 39 | 46 | CCYYMMDD |
| 9 | Status | C | 1 | 47 | 47 | Policy status |
| 10 | Company Type | C | 1 | 48 | 48 | For example: corporation, joint venture, partnership, government entity, or sole proprietorship |
| 11 | Business Description | C | 60 | 49 | 108 | |
| 12 | Policy Name | C | 40 | 109 | 148 | |
| 13 | Billing Cycle | C | 1 | 149 | 149 | |
| 14 | Records Address Line1 | C | 30 | 150 | 179 | Address at which payroll records are located |
| 15 | Records Address Line2 | C | 30 | 180 | 209 | Address at which payroll records are located |
| 16 | Records City | C | 20 | 210 | 229 | Address at which payroll records are located | a) Policy File

| FIELD # | FIELD NAME | FORMAT | SIZE | START | FINISH | DESCRIPTION |
|---|---|---|---|---|---|---|
| 17 | Records State | C | 2 | 230 | 231 | Address at which payroll records are located |
| 18 | Records Zip Code | C | 9 | 232 | 240 | Address at which payroll records are located |
| 19 | Mailing Address Line1 | C | 30 | 241 | 270 | Mailing address for business |
| 20 | Mailing Address Line2 | C | 30 | 271 | 300 | Mailing address for business |
| 21 | Mailing Address Line3 | C | 30 | 301 | 330 | Mailing address for business |
| 22 | Mailing Address Line4 | C | 30 | 331 | 360 | Mailing address for business |
| 23 | Mailing City | C | 20 | 361 | 380 | City of mailing address |
| 24 | Mailing State | C | 2 | 381 | 382 | State of mailing address |
| 25 | Mailing Zip Code | C | 9 | 383 | 391 | Zip + 5 code of mailing address |
| 26 | SIC Code | N | 4 | 392 | 395 | Standard Industry Classification (SIC) |
| 27 | NAICS Code | N | 6 | 396 | 401 | Will replace SIC codes. Until then, fill with blanks. |
| | User-Defined Fields | | | | | Space is provided for user-defined fields of data |
| 28 | | | | | | |
| 33 | Filler | C | 28 | 417 | 444 | Fill with blanks | b) Policy Status History File

| FIELD # | FIELD NAME | FORMAT | SIZE | START | FINISH | DESCRIPTION |
|---|---|---|---|---|---|---|
| 1 | Record_Type | C | 1 | 1 | 1 | Always "D" = Data |
| 2 | Policy Number | C | 7 | 2 | 8 | |
| 3 | Reinstate/Renewal Number | N | 3 | 9 | 11 | |
| 4 | Transaction Date | CMD | 8 | 12 | 19 | CCYYMMDD |
| 5 | Transaction Time | C | 7 | 20 | 26 | HHMMSSS |
| 6 | Transaction Flag | C | 1 | 27 | 27 | Specifies type of change: S = Status, Cancel Date or Cancel Reason N = 30-Day Notice |
| | Policy Status Information | | | | | For this section, only populate when Transaction Flag = 'S', otherwise fill with blanks |
| 7 | Status | C | 1 | 28 | 28 | Policy status. Contains only policies that have been activated. |
| 8 | Policy Cancel Date | CMD | 8 | 29 | 36 | CCYYMMDD |
| 9 | Cancel Reason | C | 3 | 37 | 39 | |
| | 30-Day Notice information | | | | | For this section, only populate when Transaction Flag = 'N', otherwise fill with blanks |
| 10 | 30-Day Notice Reason | C | 1 | 40 | 41 | |
| | User Defined Fields | | | | | |
| 11 | Filler | C | 40 | 41 | 80 | Fill with blanks | c) Audit File

| FIELD # | FIELD NAME | FORMAT | SIZE | START | FINISH | DESCRIPTION |
|---|---|---|---|---|---|---|
| 1 | Record_Type | C | 1 | 1 | 1 | Always "D" = Data |
| 2 | (FK) Policy Number | C | 7 | 2 | 8 | |
| 3 | Audit ID | C | 6 | 9 | 14 | Unique ID for each audit |
| 4 | Billing Location Code | C | 3 | 15 | 17 | Only for continuous policies |
| 5 | Audit Location Code | C | 3 | 18 | 20 | Code giving location of employer. See accompanying table |
| 6 | Begin Date | CMD | 8 | 21 | 28 | First day of period covered by audit |
| 7 | End Date | CMD | 8 | 29 | 36 | Last day of period covered by audit |
| 8 | Auditor ID | C | 8 | 37 | 44 | User ID of auditor who performed the audit |

-continued c) Audit File

| FIELD # | FIELD NAME | FORMAT | SIZE | START | FINISH | DESCRIPTION |
|---|---|---|---|---|---|---|
| 9 | Total Adjustment | N | 11 | 45 | 55 | Dollar amount difference between the amount billed before the audit and audited amount. Two places after the decimal point. |
| 10 | Transaction Date | CMD | 8 | 56 | 63 | |
| 11 | Audit Type | C | 2 | 64 | 65 | |
| | | | User-Defined Fields | | | |
| 12 | | | | | | Space is reserved for user-defined fields. |
| 13 | Filler | C | 40 | 68 | 107 | | d) Payroll/Adjustment Header File

| FIELD # | FIELD NAME | FORMAT | SIZE | START | FINISH | DESCRIPTION |
|---|---|---|---|---|---|---|
| 1 | Record_Type | C | 1 | 1 | 1 | Always "D" = Data |
| 2 | Policy Number | C | 7 | 2 | 8 | |
| 3 | Reinstate/Renewal Number | N | 3 | 9 | 11 | |
| 4 | Header ID | C | 50 | 12 | 61 | Unique ID |
| | | | Transaction Information | | | |
| 5 | Transaction Date | CMD | 8 | 62 | 69 | The date the transaction was entered into the insurer's system. |
| 6 | Type | C | 1 | 70 | 70 | P = Payroll Report<br>R = Adjustment |
| 7 | Start Date | CMD | 8 | 71 | 78 | Start date of the payroll report or adjustment (CCYYMMDD) |
| 8 | End Date | CMD | 8 | 79 | 86 | End date of the payroll report or adjustment (CCYYMMDD) |
| 9 | Location Code | C | 3 | 87 | 89 | A number identifying which location. |
| 10 | Number of Lines | N | 3 | 90 | 92 | The number of lines in the Payroll/Adjustment Line file associated with this record in the Header file |
| 11 | Filler | C | 25 | 93 | 127 | Space created for future use |
| | | | Policy Information | | | As of the start date of the payroll report period or audit period |
| 12 | Policy Type | C | 1 | 118 | 118 | C = Continuous<br>T = Term |
| 13 | Company Type | C | 1 | 119 | 119 | See policy file for examples |
| 14 | SIC Code | N | 4 | 120 | 123 | Standard Industry Code |
| 15 | NAICS Code | N | 6 | 124 | 129 | Will replace SIC codes. Until then, blank. |
| 16 | E-Mod | N | 9 | 130 | 138 | Experience modification percent |
| 17 | Safety Record Discount | N | 9 | 139 | 147 | Safety Record Discount percent |
| 18 | Filler | C | 25 | 148 | 172 | Space created for future use |
| | | | Payroll Report Information | | | For this section, only populate when Type = 'P', otherwise filled with blanks. |
| 19 | Total Premium Amount | N | 11 | 173 | 183 | Total reported premium for the most recent payroll report |
| 20 | Filler | C | 25 | 184 | 208 | Space created for future use |
| | | | Adjustment Information | | | For this section, only populate when Type = 'R', otherwise filled with blanks. |
| 21 | Adjustment Type | C | 2 | 209 | 210 | AC = Accounting Dept Audit<br>AD = Auditing Dept Audit |
| 22 | Adjustment Amount | N | 11 | 211 | 221 | |
| 23 | Pre-Adjustment Premium Amount | N | 12 | 222 | 233 | |
| 24 | Filler | C | 25 | 234 | 258 | Space created for future use |
| | | | User-Defined Fields | | | |
| 25 | | | | | | Space reserved for user-defined fields. | e) Payroll/Adjustment Line File

| FIELD # | FIELD NAME | FORMAT | SIZE | START | FINISH | DESCRIPTION |
|---|---|---|---|---|---|---|
| 1 | Record_Type | C | 1 | 1 | 1 | Always "D" = Data |
| 2 | Policy Number | C | 7 | 2 | 8 | |
| 3 | Reinstate/Renewal Number | N | 3 | 9 | 11 | |
| 4 | Header ID | C | 50 | 12 | 61 | The unique ID for the records in the Header File |
| 5 | Line Number | N | 4 | 62 | 65 | Original sequential numbering of the lines associated with each header. |
| | | | Transaction Information | | | |
| 6 | Transaction Date | CMD | 8 | 66 | 73 | CCYYMMDD |
| 7 | Type | C | 1 | 74 | 74 | P = Payroll Report<br>R = Adjustment |
| 8 | Start Date | CMD | 8 | 75 | 82 | Start date of the payroll report or adjustment (CCYYMMDD) |
| 9 | End Date | CMD | 8 | 83 | 90 | End date of the payroll report or adjustment (CCYYMMDD) |
| 10 | Class Code | C | 4 | 91 | 94 | NCCI format codes and:<br>EMOD = E-mod<br>SAFE = Safety Record Plan<br>SIZE = Premium Size Discount<br>MINM = Override Computed Premium<br>OTHR = Other Discounts or Multipliers |
| 11 | State Code | C | 2 | 95 | 96 | The state to which the payroll for this class code was paid. Use NCCI standard format |
| 12 | Class Description | C | 50 | 97 | 146 | |
| 13 | Rate | N | 7 | 147 | 153 | Rate for that class code |
| 14 | Filler | C | 25 | 154 | 178 | Space created for future use |
| | | Payroll Report Information | | | | For this section, only populate when Type = 'P', otherwise filled with blanks. |
| 15 | Premium Basis | N | 13 | 179 | 191 | Premium basis for that class code (in payroll, seats or in-servants) |
| 16 | Type of Premium Basis | C | 1 | 192 | 192 | P = Payroll<br>S = Seats<br>C = Per Capita In-servants |
| 17 | Multiplier | N | 9 | 193 | 201 | Multiplier for that class code (four places after decimal point) |
| 18 | Premium Amount | N | 11 | 202 | 212 | Basis * multiplier |
| 19 | Filler | C | 25 | 213 | 237 | Space created for future use |
| | | Adjustment Information | | | | For this section, only populate when Type = 'R', otherwise filled with blanks. |
| 20 | Adjustment Sequence Number | N | 3 | 238 | 240 | Distinguishes adjustment periods within an audit |
| 21 | Adjusted Premium Basis | N | 13 | 241 | 253 | |
| 22 | Adjustment Amount | N | 11 | 254 | 264 | Class adjustment amount |
| 23 | Adjusted Multiplier | N | 9 | 265 | 273 | Post-audit multiplier for that class code |
| 24 | Pre-Adjusted Premium Basis | N | 13 | 274 | 286 | |
| 25 | Pre-Adjusted Premium Amount | N | 12 | 287 | 298 | Pre-adjusted class premium amount |
| 26 | Pre-Adjusted Multiplier | N | 9 | 299 | 307 | Pre-audit multiplier for that class code |
| 27 | Filler | C | 25 | 308 | 332 | Space created for future use |
| | | User-Defined Fields | | | | |
| 28 | | | | | | Space reserved for user-defined fields |
| 29 | Filler | C | 37 | 336 | 372 | Fill with blanks | f) Estimated Payroll Report File

| FIELD # | FIELD NAME | FORMAT | SIZE | START | FINISH | DESCRIPTION |
|---|---|---|---|---|---|---|
| 1 | Record_Type | C | 1 | 1 | 1 | Always "D" = Data |
| 2 | Policy Number | C | 7 | 2 | 8 | |

-continued f) Estimated Payroll Report File

| FIELD # | FIELD NAME | FORMAT | SIZE | START | FINISH | DESCRIPTION |
|---|---|---|---|---|---|---|
| 3 | Reinstate/Renewal Number | N | 3 | 9 | 11 | The renewal number for the term to which the estimated payroll report applies |
| 4 | Transaction Date | CMD | 8 | 12 | 19 | The date the estimated payroll was entered into the system (CCYYMMDD) |
| 5 | Start Date | CMD | 8 | 20 | 27 | Start date of the term to which the estimated payroll report applies (CCYYMMDD) |
| 6 | End Date | CMD | 8 | 28 | 35 | End date of the term to which the estimated payroll report applies (CCYYMMDD) |
| 7 | Class Code | C | 4 | 36 | 39 | NCCI format codes and:<br>EMOD = E-mod<br>SAFE = Safety Record Plan<br>SIZE = Premium Size Discount<br>OTHR = Other Discounts or Multipliers |
| 8 | State Code | C | 2 | 40 | 41 | The state to which the payroll for this class code was paid. Use NCCI standard format. If multiple-state payrolls have been aggregated, put "XX" |
| 9 | Class Description | C | 50 | 42 | 91 | |
| 10 | Premium Basis | N | 13 | 92 | 104 | Premium basis for that class code (in payroll, seats or in-servants) |
| 11 | Type of Premium Basis | C | 1 | 105 | 105 | P = Payroll<br>S = Seats<br>C = Per Capita In-servants |
| 12 | Rate | N | 7 | 106 | 112 | The rate for that class code (two places after the decimal point) |
| 13 | Multiplier | N | 9 | 113 | 121 | Multiplier for that class code (four places after decimal point) |
| 14 | Premium Amount | N | 11 | 122 | 132 | Basis * multiplier |
| 15 | Minimum Premium | N | 7 | 133 | 139 | Minimum Premium for the policy (two places after decimal point) |
| 16 | Report Source Code | C | 1 | 140 | 140 | Code indicating whether the estimated payroll report was generated by the policy holder or by the insurer's system.<br>P = policyholder<br>S = system generated |
| 17 | Filler | C | 40 | 141 | 180 | Fill with blanks | g) Officer File

| FIELD # | FIELD NAME | FORMAT | SIZE | START | FINISH | DESCRIPTION |
|---|---|---|---|---|---|---|
| 1 | Record_Type | C | 1 | 1 | 1 | Always "D" = Data |
| 2 | Policy Number | C | 7 | 2 | 8 | |
| 3 | Officer I.D. Number | C | 9 | 9 | 17 | Unique BA number for each principal |
| 4 | Transaction Date | CMD | 8 | 18 | 25 | CCYYMMDD |
| 5 | Officer Start Date | CMD | 8 | 26 | 33 | CCYYMMDD |
| 6 | Officer End Date | CMD | 8 | 34 | 41 | CCYYMMDD |
| 7 | Officer Coverage Indicator | C | 1 | 42 | 42 | Y = Principal Covered<br>N = Principal Not Covered |
| 8 | Officer Class Code | C | 4 | 43 | 46 | |
| 9 | Officer Class Code State | C | 2 | 47 | 48 | |
| 10 | Coverage Effective Date | CMD | 8 | 49 | 56 | Date principal coverage begins (CCYYMMDD) |
| 11 | Coverage Discontinue Date | CMD | 8 | 57 | 64 | Date principal coverage ends (CCYYMMDD) |
| 12 | Officer Title | C | 10 | 65 | 74 | Code for principal's title |
| 13 | Officer Last Name | C | 10 | 75 | 114 | |
| 14 | Officer First Name | C | 15 | 115 | 129 | |
| 15 | Officer SSN | C | 9 | 130 | 138 | Officer's social security number |
| 16 | Filler | C | 40 | 139 | 178 | Space created for future use |

| | h) E-Mod/Safety Record History File | | | | | |
|---|---|---|---|---|---|---|
| FIELD # | FIELD NAME | FORMAT | SIZE | START | FINISH | DESCRIPTION |
| 1 | Record_Type | C | 1 | 1 | 1 | Always "D" = Data |
| 2 | Policy Number | C | 7 | 2 | 8 | |
| 3 | Transaction Date | CMD | 8 | 9 | 16 | The date the transaction was entered into the insurer's system (CCYYMMDD) |
| 4 | Rate Flag | C | 1 | 17 | 17 | E = E-mod<br>S = Safety Record Discount |
| 5 | Effective Date | CMD | 8 | 18 | 25 | Effective date of the e-mod or safety record discount rate |
| 6 | Expiration Date | CMD | 8 | 26 | 33 | Expiration date of the e-mod or Safety Record discount rate |
| 7 | E-Mod / Safety Record Discount | N | 5 | 34 | 38 | The e-mod or safety record discount rate (two places after the decimal point) |
| 8 | Filler | C | 40 | 39 | 78 | Fill with blanks |

| | i) Claim File | | | | | |
|---|---|---|---|---|---|---|
| FIELD # | FIELD NAME | FORMAT | SIZE | START | FINISH | DESCRIPTION |
| 1 | Record_Type | C | 1 | 1 | 1 | Always "D" = Data |
| 2 | Policy Number | C | 7 | 2 | 8 | |
| 3 | Claim Number | C | 9 | 9 | 17 | |
| 4 | Open/Close Indicator | C | 1 | 18 | 18 | C = Closed<br>O = Open |
| 5 | Claim Status | C | 1 | 19 | 19 | Status of the claim. See accompanying table. |
| 6 | Claim Opened Date | CMD | 8 | 20 | 27 | CCYYMMDD |
| 7 | Claim Closed Date | CMD | 8 | 28 | 35 | CCYYMMDD |
| 8 | Claim Reopened Date | CMD | 8 | 36 | 43 | CCYYMMDD |
| 9 | Claimant Name | C | 18 | 44 | 61 | |
| 10 | Claimant SSN | C | 9 | 62 | 70 | Claimant's social security number |
| 11 | Claimant Class Code | C | 4 | 71 | 74 | |
| 12 | Date of Injury | CMD | 8 | 75 | 82 | CCYYMMDD |
| 13 | Injury Body Part 1 | C | 2 | 83 | 84 | Part of body code |
| 14 | Nature of Injury 1 | C | 2 | 85 | 86 | Nature of injury code. |
| 15 | Injury Body Part 2 | C | 2 | 87 | 88 | Part of body code. |
| 16 | Nature of Injury 2 | C | 2 | 89 | 90 | Nature of injury code. |
| 17 | Injury Body Part 3 | C | 2 | 91 | 92 | Part of body code. |
| 18 | Nature of Injury 3 | C | 2 | 93 | 94 | Nature of injury code. |
| 19 | Accident Code | C | 2 | 95 | 96 | Cause of accident code. |
| 20 | Injury Type | C | 1 | 97 | 97 | 1 = Death/Fatal<br>2 = Permanent Total Disability (PTD)<br>5 = Temporary Total or Temporary Partial Disability (TTD or TPD)<br>6 = Medical Only<br>7 = Contract Medical or Hospital Allowance<br>9 = Permanent Partial Disability |
| 21 | ICD9 Code 1 | C | 6 | 98 | 103 | Diagnosis code |
| 22 | ICD9 Code 2 | C | 6 | 104 | 109 | Diagnosis code |
| 23 | ICD9 Code 3 | C | 6 | 110 | 115 | Diagnosis code |
| 24 | Payment To Date | N | 7 | 116 | 122 | Total payments to date |
| 25 | Reserves | N | 7 | 123 | 129 | The amount of reserves set aside for this claim |
| 26 | Transaction Date | CMD | 8 | 130 | 137 | CCYYMMDD |
| | | | User-Defined Fields | | | |
| 27 | | | | | | Space reserved for user-defined fields |
| 28 | Filler | C | 31 | 147 | 177 | Fill with blanks | j) Certificate File

| FIELD # | FIELD NAME | FORMAT | SIZE | START | FINISH | DESCRIPTION |
|---|---|---|---|---|---|---|
| 1 | Record_Type | C | 1 | 1 | 1 | Always D = Data |
| 2 | Policy Number | C | 7 | 2 | 8 | |
| 3 | Certificate ID | C | 7 | 9 | 15 | |
| 4 | Issue Date | CMD | 8 | 16 | 23 | |
| 5 | Expire Date | CMD | 8 | 24 | 31 | |
| 6 | Cancel Date | CMD | 8 | 32 | 39 | |
| 7 | Transaction Date | CMD | 8 | 40 | 47 | Date transaction entered in insurer's system |
| 8 | Filler | C | 50 | 48 | 97 | Fill with blanks |

15

2. Fraud Detection System Generated Data Each time it scores the policies, the predictive model 622 and rule-based model 620 generate scores, reason codes, and red-flag results. These results are processed by the post-scoring process, which produces an output data feed in the following format. From this data feed, either the system or the insurer may create red-flag lists and other lists or tools to assist the investigative staff in prioritizing policies for investigation.

| FIELD # | FIELD NAME | FORMAT | SIZE | START | FINISH | DESCRIPTION |
|---|---|---|---|---|---|---|
| | | | Identifier | | | |
| 1 | Record_Type | C | 1 | 1 | 1 | Always "D" = Data |
| 2 | Policy Number | C | 7 | 2 | 8 | Policy Number |
| 3 | Date of Score | CMD | 8 | 9 | 16 | Date Scored by VeriComp Employer (CCYYMMDD) |
| 4 | Scoring period Start Date | CMD | 8 | 17 | 24 | The start date of the scoring period |
| 5 | Scoring period End Date | CMD | 8 | 25 | 32 | The end date of the scoring period |
| 6 | Filler | C | 20 | 33 | 52 | |
| | | | Model Data | | | |
| 7 | Score | C | 4 | 53 | 56 | 0-1000. Neural Net Score. Spaces if not provided. |
| 8 | Model ID | C | 8 | 57 | 64 | Label of the scoring model. |
| 9 | Error Code | C | 5 | 65 | 69 | 0-99999 if an error detected. Spaces if no error detected. |
| 10 | Exclusion Code | C | 2 | 70 | 71 | 0 = No Exclusions, Policy will be scored<br>1 = No Payroll Report found within last 12 months<br>2 = Overlapping Payroll Reports<br>3 = Gaps in the Payroll Reports<br>4 = Insufficient Payroll History<br>5 = Adjustments across the boundary of the scoring period<br>6 = Zero Total Payroll in Scoring period<br>7 = Negative Total Payroll in Scoring period |
| 11 | Reason_1 | C | 4 | 72 | 75 | Reason Code 1. Spaces if no more reasons provided. |
| 12 | Reason_2 | C | 4 | 76 | 79 | Reason Code 2. Spaces if no more reasons provided. |
| 13 | Reason_3 | C | 4 | 80 | 83 | Reason Code 3. Spaces if no more reasons provided. |
| 14 | Reason_4 | C | 4 | 84 | 87 | Reason Code 4. Spaces if no more reasons provided. |
| 15 | Reason_5 | C | 4 | 88 | 91 | Reason Code 5. Spaces if no more reasons provided. |
| 16 | Premium Amount | N | 11 | 92 | 102 | Policy Premium for the Scoring period |
| 17 | Filler | C | 20 | 103 | 122 | |

-continued

| FIELD # | FIELD NAME | FORMAT | SIZE | START | FINISH | DESCRIPTION |
|---|---|---|---|---|---|---|
| | Red Flag Data | | | | | |
| | Red Flag 1 | | | | | |
| 18 | Red Flag 1 ID | C | 4 | 123 | 126 | ZPCT = Zero Payroll with Certificates |
| 19 | Red Flag 1 Indicator | C | 1 | 127 | 127 | Y/N. This flag has been tripped. |
| 20 | User Defined Fields | C | 30 | 128 | 157 | |
| | Red Flag 2 | | | | | |
| 21 | Red Flag 2 ID | C | 4 | 158 | 161 | ZPCM = Zero Payroll with Claims |
| 22 | Red Flag 2 Indicator | C | 1 | 162 | 162 | Y/N. This flag has been tripped. |
| 23 | User Defined Fields | C | 30 | 163 | 192 | |
| | Red Flag 3 | | | | | |
| 24 | Red Flag 3 ID | C | 4 | 193 | 196 | CMNC = Claims with No Class Code on the Policy |
| 25 | Red Flag 3 Indicator | C | 1 | 197 | 197 | Y/N. This flag has been tripped. |
| 26 | User Defined Fields | C | 30 | 198 | 227 | |
| | Red Flag 4 | | | | | |
| 27 | Red Flag 4 ID | C | 1 | 228 | 231 | Four Letter ID for the Red Flag |
| 28 | Red Flag 4 Indicator | C | 1 | 232 | 232 | Y/N. This flag has been tripped. |
| 29 | User Defined Fields | C | 30 | 233 | 262 | |
| | Red Flag 5 | | | | | |
| 30 | Red Flag 5 ID | C | 4 | 263 | 266 | Four Letter ID for the Red Flag |
| 31 | Red Flag 5 Indicator | C | 1 | 267 | 267 | Y/N. This flag has been tripped. |
| 32 | User Defined Fields | C | 30 | 268 | 297 | |
| | Red Flag 6 | | | | | |
| 33 | Red Flag 6 ID | C | 4 | 298 | 301 | Four Letter ID for the Red Flag |
| 34 | Red Flag 6 Indicator | C | 1 | 302 | 302 | Y/N. This flag has been tripped. |
| 35 | User Defined Fields | C | 30 | 303 | 332 | |
| | Red Flag 7 | | | | | |
| 36 | Red Flag 7 ID | C | 4 | 333 | 336 | Four Letter ID for the Red Flag |
| 37 | Red Flag 7 Indicator | C | 1 | 337 | 337 | Y/N. This flag has been tripped. |
| 38 | User Defined Fields | C | 30 | 338 | 367 | |
| 39 | Filler | C | 20 | 368 | 387 | |
| | User-Defined Fields | | | | | |
| 40 | | | | | | Space reserved for user defined fields. |

We claim:

1. A method for detecting misrepresentation of policy related information provided to an insurer by a policyholder where the information is used by the insurer in determining an amount of premium to be paid for insurance coverage provided to the policyholder, the method comprising:

selecting, by one or more computing systems, a plurality of insurance policies to process with a predictive model;

for each selected policy, deriving variables from policy related information provided by the policyholder in connection with the selected policy, the derived variables not including claim related information; and for each selected policy, applying, by the one or more computing systems, the derived variables of the policy to the predictive model to generate a model score indicating the relative likelihood of misrepresented information provided by the policyholder or an expected adjustment of the premium on the policy.

2. The method of claim 1, further comprising:

collecting, by one or more computing systems, training data including a plurality of insurance policies having misrepresented information and a plurality of policies not having misrepresented information; developing, by one or more computing systems, the predictive model from the training data; and storing, by one or more computing systems, the predictive model.

3. The method of claim 1 further comprising:

converting, by one or more computing systems, the model score to a fraud score indicating a probability of fraud in the policy.

4. The method of claim 1, further comprising:
converting, by one or more computing systems, the model score to the expected adjustment of the premium on the policy.

5. The method of claim 1, wherein selecting a plurality of insurance policies further comprises:
for each policy, automatically determining, by one or more computing systems, start and end dates of a scoring period over which misrepresented policy information is to be detected.

6. The method of claim 5, wherein the start and end dates of the scoring period for which the policy has consistent and complete data.

7. The method of claim 5, further comprising:
responsive to a policy not having consistent or complete data in the scoring period, defining, by one or more computing systems, an exclusion code providing a reason that the policy was not selected.

8. The method of claim 5, wherein the insurance policies are workers' compensation insurance policies, and automatically determining start and end dates of the scoring period further comprises:
defining, by one or more computing systems, the start and end dates such that all audit adjustments are contained between the start and end dates.

9. The method of claim 1, wherein selecting a plurality of insurance policies further comprises:
for each policy, receiving, by one or more computing systems, a user defined scoring period to be scored for the policy; and automatically selecting, by one or more computing systems, those policies having consistent and complete data in the respective user defined time period from which the variables for the predictive model may be derived.

10. The method of claim 9, further comprising:
responsive to a policy not having consistent or complete data in the user defined time period defining, by one or more computing systems, an exclusion code providing a reason that the policy was not selected.

11. The method of claim 9, further comprising:
responsive to a policy not having consistent or complete data in the user defined scoring period, automatically suggesting, by one or more computing systems, a scoring period in which the policy has consistent and complete data.

12. The method of claim 1, wherein deriving variables from policy related information further comprises:
determining, by one or more computing systems, a plurality of peer groups of which the selected policy is a member; and for each peer group or set of peer groups of which the selected policy is a member, deriving, by one or more computing systems, variables from the policy information which attribute characteristics of the peer group or set of peer groups to the selected policy, or which compare the selected policy to other policies in the peer group or set of peer groups.

13. The method of claim 12, wherein the derived variables estimate the probability of a dichotomous outcome or a certain distributional statistic of a continuous quantity for a policy, based on the peer group(s) of which the policy is a member.

14. The method of claim 12, wherein deriving variables for the policy which compare the policy to other policies in its peer group(s) further comprises deriving, by one or more computing systems, variables that compare either at least one characteristic e of the policy with at least one corresponding characteristic of the policies in its peer group(s).

15. The method of claim 12, further comprising:
for each of the plurality of peer groups, storing, by one or more computing systems, in a lookup table group statistics for policy characteristics of the policies in the peer group; and
deriving, by one or more computing systems, the variables for a selected policy by determining the peer group to which the selected policy belongs and using the statistics for the policy characteristics for the peer group to derive the variables for the selected policy.

16. The method of claim 15, further comprising:
updating, by one or more computing systems, the lookup table for a peer group of the selected policy using policy information from the selected policy.

17. The method of claim 1, wherein deriving variables further comprises:
deriving, by one or more computing systems, variables from the policy information which compare the selected policy in a selected time period with the selected policy in a time period prior to the selected time period.

18. The method of claim 17, wherein deriving variables from the policy information which compare the selected policy in a selected time period with the selected policy in a time period prior to the selected time period further comprises:
deriving, by one or more computing systems, variables which quantify an amount or distribution of risk-related activities associated with the policy.

19. The method of claim 17, wherein deriving variables from the policy information which compare the selected policy in a selected time period with the selected policy in a time period prior to the selected time period further comprises:
determining, by one or more computing systems, at least one measure which is a percentage change in a policy characteristics between the selected time period and the previous time period.

20. The method of claim 17, wherein deriving variables from the policy information which compare the selected policy in a selected time period with the selected policy in a time period prior to the selected time period further comprises:
determining, by one or more computing systems, a vector policy characteristics for the selected time period and a vector of the policy characteristics in the prior time period; and determining, by one or more computing systems, a scalar measure of comparison between the two vectors.

21. The method of claim 20, wherein the scalar measure of comparison between the two vectors is computed as either a measure of distance between the two vectors or an angle measure between the two vectors.

22. The method of claim 17, wherein deriving variables from the policy information which compare the selected policy in a selected time period with the selected policy in a time period prior to the selected time period further comprises:
determining, by one or more computing systems, a percent change in a payroll share in at least one employment classification in the selected time period relative to the previous time period.

23. The method of claim 17, wherein deriving variables from the policy information which compare the selected policy in a selected time period with the selected policy in a time period prior to the selected time period further comprises:

determining, by one or more computing systems, a percent change in a payroll share in an exception group in the selected time period relative to the previous time period.

24. The method of claim 17, wherein deriving variables from the policy information which compare the selected policy in a selected time period with the selected policy in a time period prior to the selected time period further comprises:
   determining, by one or more computing systems, a vector distance between vectors of payroll percent shares in each of a plurality of employment classes in the selected time period and in the prior time period.

25. The method of claim 24, wherein the employment classes are SIC employment classes.

26. The method of claim 24, wherein the employment class groups are NCCI employment class groups.

27. The method of claim 24, wherein the employment class groups are rate-driven employment class groups.

28. The method of claim 24, wherein the employment class groups are data-driven employment class groups, each group including employment classes that are likely to appear together in payroll reports.

29. The method of claim 17, wherein deriving variables from the policy information which compare the selected policy in a selected time period with the selected policy in a time period prior to the selected time period further comprises:
   determining, by one or more computing systems, a percent change in a number of claims filed on the policy in the selected time period relative to number of claims filed on the policy in the prior time period.

30. The method of claim 17, wherein deriving variables from the policy information which compare the selected policy in a selected time period with the selected policy in a time period prior to the selected time period further comprises:
   determining, by one or more computing systems, a vector distance between a first vector of the number of claims filed in the selected time period for each of a plurality of injury types and a second vector of the number of claims filed in the prior time period in each of the plurality of injury types.

31. The method of claim 1, wherein the insurance policies are workers' compensation insurance policies and the policy relative information from which the variables for assessing the policies are derived includes payroll reports for the policyholder.

32. The method of claim 1, further comprising:
   deriving, by one or more computing systems, direct policy variables which measure characteristics of the policyholder or the policy itself without comparison to other policies or the same policy in a prior time period.

33. The method of claim 32, wherein the direct policy variables are selected from the group consisting of:
   type of company of the policyholder;
   location of the policyholder;
   number of employees of the policyholder;
   number of policy cancellations; age of the policy;
   industry type of the policyholder;
   amount of payroll reported by the policyholder; and
   distribution of payroll reported by the policyholder with respect to at least one employment class.

34. The method of claim 1, further comprising:
   deriving, by one or more computing systems, direct claim variables which measure characteristics of claims filed on policy.

35. The method of claim 34, wherein the direct claim variables are selected from the group consisting of:
   number of claims filed during the selected time period;
   dollar amount of claims filed during the selected time period;
   type of claims filed during the selected time period;
   number of claims filed during the selected time period relative to amount of premium paid during the selected time period; and
   number of claims filed during the selected time period relative to a size of payroll during the selected time period.

36. The method of claim 1, further comprising:
   deriving, by one or more computing systems, variables that measure the probability of fraud in the policy conditionally based on at least one policy characteristic of the policy.

37. The method of claim 1, further comprising:
   applying, by one or more computing systems, the policy to a plurality of decision rules which identify specific inconsistent or suspicious policy facts related to the policy, to generate an output indicating which decision rules were violated by the policy.

38. The method of claim 37, wherein the decision rules are derived from statistical analysis of insurance policies of at least one insurer which have been determined to contain misrepresented policy information.

39. The method of claim 37, wherein the insurance policies are workers' compensation insurance policies and wherein the decision rules are selected from a group consisting of:
   a decision rule that identifies as potentially fraudulent a policy that has an employment class code on a claim with an injury date during the selected time period but the employment class code for the claim is not included in payroll reports for the policy during the selected time period;
   a decision rule that identifies as potentially fraudulent a policy that reports zero payroll during the selected time period but for which one or more certificates of insurance were issued during the selected time period;
   a decision rule that identifies as potentially fraudulent a policy that reports zero payroll during the selected time period but which has at least one claim with an injury date during the selected time period;
   a decision rule that identifies as potentially fraudulent a policy with an officer who is currently or was selectedly an officer on a different policy and where the new policy has a lower experience modification factor than the prior policy; and
   a decision rule that identifies as potentially fraudulent a policy that has an employment class code on a claim and for which no premium was reported at the time the claim was opened.

40. The method of claim 1, further comprising:
   for each selected policy, determining, by one or more computing systems, at least one variable which significantly contributes to the model score for the policy; and
   outputting, by one or more computing systems, a reason for the model score with respect to the determined at least one variable.

41. The method of claim 40, wherein the insurance policies are workers' compensation insurance policies, and wherein the significant variable is selected from a group consisting of:
   an indication of whether the policy has been previously audited;
   an indication of whether a reported payroll has been adjusted;

a number of employment class codes in at least one payroll report of the policyholder during the selected time interval;
a type of company of the policyholder;
an age of the policy;
a size of payroll of the policyholder;
a size of a premium paid on the policy;
an industry classification code of the policyholder;
a distribution of payroll in at least one payroll report of the policyholder during the selected time interval;
a percent payroll share in a low rated employment class code;
a change in a distribution of payroll in at least one payroll report of the policy-holder during the selected time interval compared with the prior time period;
a change in an exception group payroll share in at least one payroll report of the policyholder during the selected time interval compared with the prior time period;
a payroll share in a group of agriculture related employment classes; a payroll share in a group of construction related employment classes;
a payroll share in a group of manufacturing related employment classes; a payroll share in a group of government related employment classes;
a payroll share in at least one clerical employment classes;
a number of prior cancellations of the policy;
a ratio of the number of claims made on the policy to a size of the payroll of the policyholder; and
a number of claims on the policy during the selected time interval.

42. A method of estimating a quantity corresponding to a set of entities grouped using one or more hierarchical categories, the method comprising:
determining, by one or more computing systems, an estimate of the quantity for a first category corresponding to the highest level of the hierarchy; and
for each subsequent category representing a current lower level of the hierarchy, adjusting, by one or more computing systems, the estimate of the quantity using an estimate for the current level and the estimate of the higher level, the quantity being estimated being a risk factor characterizing misrepresentation of policy related information provided to an insurer by a policyholder where the information is used by the insurer in determining an amount of premium to be paid for insurance coverage provided to the policyholder, wherein adjusting the estimate of the quantity comprises applying, by one or more computing systems, a Bayesian adjustment to the estimate using the estimate for the current level of the hierarchy and the estimate of the quantity from the higher level, the risk factor being to generate variables derived from policy related information provided by a policyholder in connection with a corresponding policy, the generated variables being used by a predictive model to generate a score indicating the likelihood of misrepresentation of policy information by the policyholder of the policy.

43. The method of claim 42, wherein each category of the hierarchy has a value for the risk factor.

44. The method of claim 42, wherein the hierarchy of categories are Standard Industry Classification codes (SIC), and the quantity being estimated is risk factor associated with each SIC code.

45. A system for detecting premium fraud in an insurance policy, comprising:
a database of insurance policies, each policy associated with a policyholder and having policy related data; and
a computer system that implements:
a policy selection process that selects from the database a number of policies for scoring;
a variable derivation process that derives for each of the selected policies variables associated with the policyholder of the policy for comparing the policy to peer group policies, and variables for comparing the policy in a selected time period with the policy a time period prior to the selected time period, the variables being derived from policy related information provided by the policyholder in connection with the corresponding policy and not including claim related information; and
a fraud detection module that receives for each policy the derived variables and generates a score indicating the likelihood of misrepresentation of policy information by the policyholder of the policy.

46. The system of claim 45, wherein the fraud detection module further comprises:
a predictive model that generates a model score indicating a relative likelihood of misrepresentation of policy information by the policyholder; and
a post scoring process that converts the model score into the fraud score indicating a probability of misrepresentation of policy information.

47. The system of claim 46, wherein the post scoring process converts the model score into an expected adjustment of premium for a policy.

48. The system of claim 46, the computer system further implementing:
a rule-based process that applies a plurality of rules to a selected policy to identify policies suspected of premium fraud based on inconsistent or incomplete policy related information.

49. A method for determining a usage strategy for processing insurance policies suspected of premium fraud, the suspected policies selected from a plurality of insurance policies, the method comprising:
establishing, by one or more computing systems, a frequency for scoring the plurality of insurance policies to obtain for each policy a score indicating a relative likelihood of premium fraud in the policy, the scoring being based solely on non-claim information;
establishing, by one or more computing systems, a ranking function for ranking the scored policies; and
establishing, by one or more computing systems, a plurality of threshold scores, and for each threshold score, defining an audit action for performing on policies which have a score exceeding the threshold score, but not exceeding a next greater threshold score.

50. The method of claim 49, wherein establishing a ranking function for ranking the scored policies further comprises:
ranking, by one or more computing systems, the scored policies according to their scores.

51. The method of claim 49, wherein establishing a ranking function for ranking the scored policies further comprises:
ranking, by one or more computing systems, the scored policies according to an expected adjusted premium.

52. The method of claim 49, wherein establishing a plurality of threshold scores further comprises:
establishing, by one or more computing systems, a first threshold score for selecting for a desk audit those policies having a score exceeding the first threshold score; and
establishing, by one or more computing systems, a second threshold score for selecting for a field audit those policies having a. score exceeding the second threshold score, wherein the second threshold score is greater than the first threshold score.

53. The method of claim 49, further comprising:
establishing, by one or more computing systems, a set of rules for identifying policies suspected of premium fraud.

54. The method of claim 49, further comprising:
establishing, by one or more computing systems, a plurality of reason codes, each reason code providing an explanation for a policy receiving a score; and
establishing, by one or more computing systems, for each of a number of reason codes, at least one audit action to be taken in response to a policy having a score which produces the reason code.

55. A method for processing insurance policies suspected of premium fraud, the method comprising;
scoring, by one or more computing systems, each of a plurality of insurance policies with a predictive model to generate for each policy a score indicating a relative likelihood of premium fraud, the score being derived from solely from policy information and not claim information;
ranking, by one or more computing systems, the scored policies according to the scores;
selecting, by one or more computing systems, for a desk audit those policies having a score exceeding a first threshold score; and
selecting, by one or more computing systems, for a field audit those policies having a score exceeding a second threshold score, wherein the second threshold score is greater than the first threshold score.

56. A method for processing insurance policies suspected of premium fraud, the method comprising:
scoring, by one or more computing systems, each of a plurality of insurance policies with a predictive model to generate for each policy a score indicating a relative likelihood of premium fraud, the score for each policy being based on measures of characteristics of the policy, policyholder, payroll, and non-claim activity related to the policy;
determining, by one or more computing systems, for each scored policy an expected premium adjustment; ranking the scored policies according to their expected premium adjustment; selecting for a desk audit those policies having an expected premium adjustment exceeding a first threshold amount; and
selecting, by one or more computing systems, for a field audit those policies having an expected premium adjustment exceeding a second threshold amount: wherein the second threshold amount is greater than the first threshold amount.

57. A method of developing a predictive model of insurance premium fraud, the method comprising:
collecting, by one or more computing systems, from at least one insurance company policy information for a plurality of insurance policies;
determining, by one or more computing systems, for each policy a scoring period for scoring the policy;
selecting a training set of policies;
deriving, by one or more computing systems, for each policy in the training set a plurality of variables from the policy information and from other information relevant to policy premiums, the set of derived variables excluding claim activity information;
applying, by one or more computing systems, the derived variables to an untrained predictive model to train the predictive model to produce a measure with respect to whether the policies are fraudulent or non-fraudulent during their respective scoring periods;
for each policy in the training set, providing, by one or more computing systems, a random value for the previously audited variable, and applying, by one or more computing systems, the derived variables and the random value of the previously audited variable to the predictive model; and
for each policy in the training set, providing, by one or more computing systems, actual value for the previously audited variable indicating whether the policy was previously audited for the scoring period, and applying, by one or more computing systems, the derived variables and the actual value of the previously audited variable to calibrate the scores produced by the predictive model; and
selecting, by one or more computing systems, a subset of the derived variables for the using in the predictive model, which variables significantly contribute to a prediction of whether a policy is fraudulent during its scoring period.

58. The method of claim 57, wherein the insurance policies are workers' compensation insurance policies, further comprising:
excluding, by one or more computing systems, from the training set policies for which no payroll is reported during the scoring period for the policy.

59. The method of claim 57, further comprising:
tagging, by one or more computing systems, each of the policies to indicate whether the policy is fraudulent, non-fraudulent or indeterminate; and
excluding, by one or more computing systems, from the training set policies which are tagged as indeterminate.

* * * * *